(12) United States Patent
Sukendro

(10) Patent No.: US 8,661,343 B2
(45) Date of Patent: Feb. 25, 2014

(54) COMPUTER-IMPLEMENTED SYSTEMS AND METHODS FOR AN AUTOMATED APPLICATION INTERFACE

(75) Inventor: Henry Sukendro, Morrisville, NC (US)

(73) Assignee: SAS Institute Inc., Cary, NC (US)

( * ) Notice: Subject to any disclaimer, the term of this patent is extended or adjusted under 35 U.S.C. 154(b) by 479 days.

(21) Appl. No.: 13/032,236

(22) Filed: Feb. 22, 2011

(65) Prior Publication Data

US 2011/0145652 A1    Jun. 16, 2011

Related U.S. Application Data

(63) Continuation-in-part of application No. 11/359,966, filed on Feb. 22, 2006, now Pat. No. 8,151,189.

(60) Provisional application No. 61/313,499, filed on Mar. 12, 2010.

(51) Int. Cl.
*G06F 3/00* (2006.01)

(52) U.S. Cl.
USPC .......................................... 715/709; 715/764

(58) Field of Classification Search
USPC ................................... 715/709, 764
See application file for complete search history.

(56) References Cited

U.S. PATENT DOCUMENTS

| | | | |
|---|---|---|---|
| 5,799,286 A | 8/1998 | Morgan et al. | |
| 5,819,293 A | 10/1998 | Comer et al. | |
| 7,404,123 B1 * | 7/2008 | Ku et al. | 714/724 |
| 2003/0018644 A1 | 1/2003 | Bala et al. | |
| 2003/0061246 A1 | 3/2003 | Bowman et al. | |
| 2005/0055193 A1 * | 3/2005 | Bondarenko | 703/22 |
| 2005/0262049 A1 | 11/2005 | Somppi | |
| 2006/0020619 A1 * | 1/2006 | Netz et al. | 707/102 |
| 2006/0064415 A1 * | 3/2006 | Guyon et al. | 707/6 |
| 2006/0136490 A1 | 6/2006 | Aggarwal et al. | |
| 2007/0028160 A1 | 2/2007 | Argo et al. | |
| 2009/0187552 A1 * | 7/2009 | Pinel et al. | 707/5 |

OTHER PUBLICATIONS

"Reporting Made Easy with JasperReports and Hibernate," http://java.sys-con.com/read/171467_p. htm,(6 pp.).

"Macro Scheduler," http://www.programurl.com/macro-scheduler.htm, (3 pp.).

"AutoMate/Complete Business Process Automation," http://www.networkautomation.com/automate/, (2 pp.).

Network Automation, Inc., "AutoMate™ 6 No Code, No Limits", 2005 (2 pp.).

"Introduction to AutoMate 6 White Paper", Revision 3, May 11, 2005, (14 pp.).

(Continued)

*Primary Examiner* — Omar Abdul-Ali

(74) *Attorney, Agent, or Firm* — Kilpatrick Townsend & Stockton LLP

(57) ABSTRACT

In accordance with the teachings described herein, systems and methods are provided for an automated application interface. One or more wizards may be used to receive user input in order to perform one or more software interface operations to manipulate a first set of data between data analysis software and database software. Information associated with the user input may be captured and used to generate one or more template data stores. A user interface may be used to modify at least one template data store to identify a subsequent set of data. The template data stores may be automatically executed in an identified sequence to perform software interface and data analysis operations for the subsequent set of data.

42 Claims, 28 Drawing Sheets

(56) References Cited

OTHER PUBLICATIONS

Advanced File Synchronizer, Backup, FTP & WebDAV Software, http://www.xellsoft.com/SynchronEX.html, (8 pp.).
"SynchronEX—Advanced File Synchronizer, Backup & FTP," http://www.xellsoft.com/synchronex_readme.html, (31 pp.).
"Buttons and Icons", online help document for SAS® activity-based management software (83 pp.).
SAS® Activity-Based Management 6.2 Tutorial, 2004, (112 pp.).
SAS® Activity-Based Management 6.2 User's Guide, 2005, (293 pp.).

* cited by examiner

| File Edit View Code Data Describe Graph Analyze OLAP Add-In Tools Window Help |
|---|

Process Flow

Project enteredco....

Process Flow / Project enteredcostelement(read-only)

| | Period | AccountDimMemberRef1 | AccountDimMemberRef2 | O | EnteredCost | Scenario |
|---|---|---|---|---|---|---|
| 1 | January 2006 | North Branch | Executive Salaries | | 100000000 | Actual |
| 2 | January 2006 | North Branch | Engineer Salaries | | 75000000 | Actual |
| 3 | January 2006 | South Branch | Executive Salaries | | 150000000 | Actual |
| 4 | January 2006 | South Branch | Administrative Salaries | | 50000000 | Actual |

Task Status

| Task | Status | Queue | Server |
|---|---|---|---|

Ready

*Fig. 10*

COMPUTER-IMPLEMENTED SYSTEMS AND METHODS FOR AN AUTOMATED APPLICATION INTERFACE

This application is a continuation-in-part of U.S. patent application Ser. No. 11/359,966, filed on Feb. 22, 2006, now U.S. Pat. No. 8,151,189 and also claims priority from U.S. Provisional Patent Application No. 61/313,499, filed on Mar. 12, 2010. The entirety of these priority applications are incorporated herein by reference.

FIELD

The technology described in this application relates generally to software interfaces. More specifically, computer-implemented systems and methods for an automated application interface are provided.

BACKGROUND

Data analysis software often requires a user to manually perform numerous operations in a specific sequence to generate a report from information stored in a database. For instance, the user is often required to manipulate data between the data analysis software and database software and perform operations on the data using both the data analysis and database software. For example, in order to generate a report using an activity based management (ABM) software application based on data stored in a database, a user may need to 1) export the appropriate table from the ABM software to the database software, 2) execute the appropriate database operation to update the table, 3) import the updated table back to the ABM software, and 4) perform any necessary operations using the ABM software to generate the report using the updated table. Although one or more wizards are typically provided to make these steps easier for the user, the process is often time consuming. Moreover, it is often necessary to perform these same tasks on a periodic basis, for example to generate periodic (e.g., monthly) reports. Programming software applications to automatically perform the necessary steps to generate a report would typically require significant programming knowledge, for example to program complicated XML or batch files.

SUMMARY

In accordance with the teachings described herein, systems and methods are provided for an automated application interface. One or more wizards may be used to receive user input in order to perform one or more software interface operations to manipulate a first set of data between data analysis software and database software. Information associated with the user input may be captured and used to generate one or more template data stores. A user interface may be used to modify at least one template data store to identify a subsequent set of data. The template data stores may be automatically executed in an identified sequence to perform software interface and data analysis operations for the subsequent set of data.

BRIEF DESCRIPTION OF THE DRAWINGS

FIGS. 6-25 are screen shots showing an example of how reports may be generated with activity based management (ABM) software using an automated application interface.

DETAILED DESCRIPTION

Figure 1:
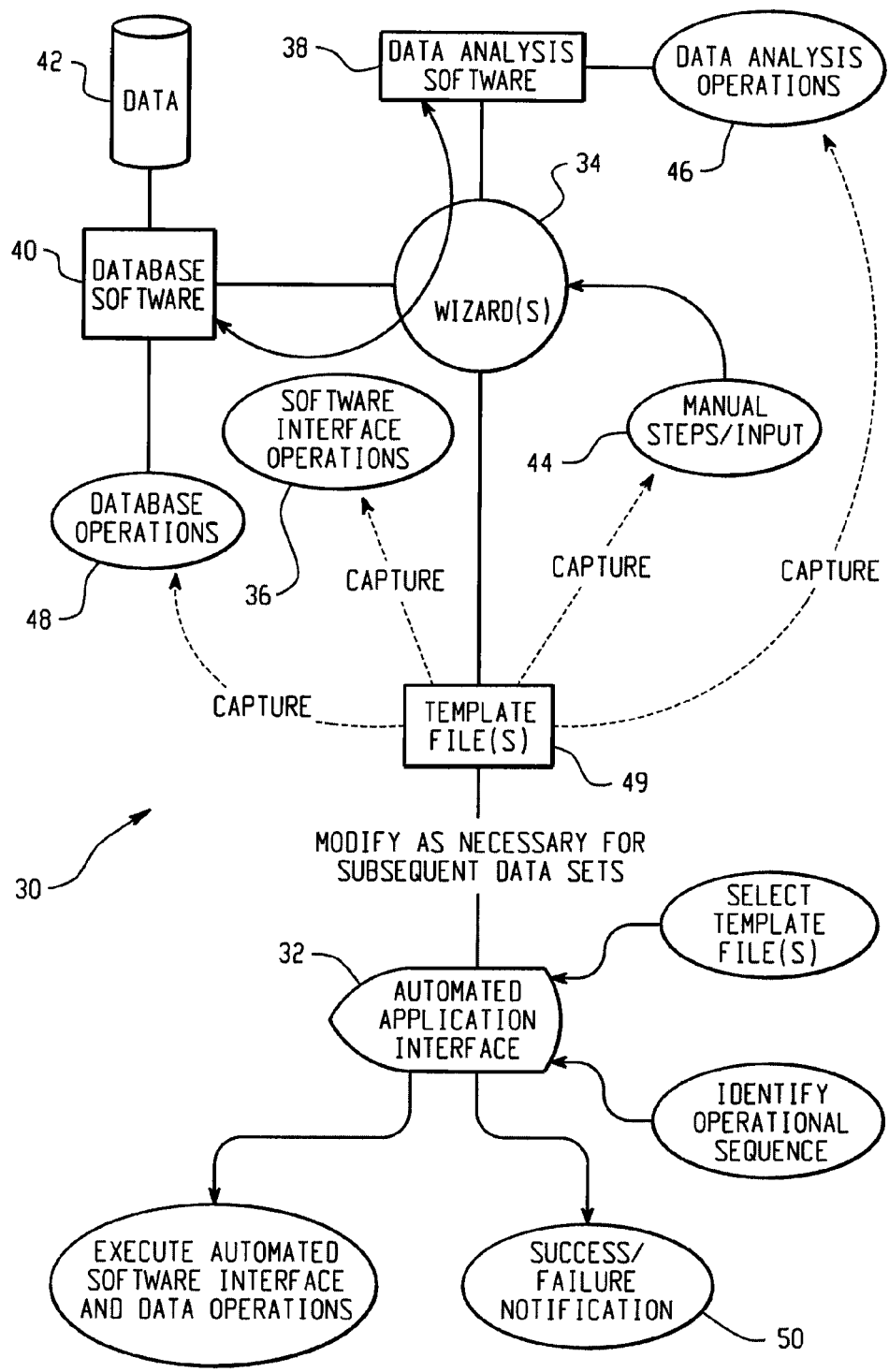
FIG. 1 is a block diagram depicting an example system for providing an automated application interface.

FIG. 1 is a block diagram depicting an example system 30 for providing an automated application interface 32. The system includes one or more wizards 34 that are used to perform one or more software interface operations 36 to manipulate data between data analysis software 38 and database software 40. The data analysis software 38 may, for example, be activity-based management (ABM) software or other software for analyzing data stored in a database 42. The database software 40 may be any known software application for managing the storage of information in a database 42. The wizards 34 are operation-specific user interfaces that are configured to receive the user input 44 necessary to perform an operation using the data analysis software or the database software. The wizards 34 may, for example, be executed by the data analysis software or the database software, or may be executed independently of the data analysis and database software.

The wizards 34 are configured to capture information associated with the user input 44 and the one or more software interface operations 36 to generate one or more template data stores 49. In addition, one or more data analysis operations 46 performed using the data analysis software 38 and one or more database operations 48 performed using the database software 40 may also be captured to generate the one or more template data stores 49. The template data stores 49 may, for example, be XML files or batch files for performing the captured operations 36, 46, 48.

In operation, the wizards 34, data analysis software 38 and database software 40 are used to perform a series of operations 36, 46, 48 on a first set of data. For example, the series of operations 36, 46, 48 may be performed to generate a first report with the data analysis software 38. The one or more template data stores 49 are generated during the process of performing the series of operations 36, 46, 48 on the first set of data. The template data stores 49 may then be used to automate the process for subsequent sets of data (e.g., to generate reports for subsequent months, etc.).

To perform the series of operations 36, 46, 48 for a subsequent set of data, the template data stores 49 are modified, as necessary, to identify the subsequent set of data. The automated application interface 32 is used to select template data stores 49 to identify the desired operations and to identify the sequence in which the operations are to be performed. The automated application interface 32 is configured to automatically execute the identified template data stores 49 in the identified sequence to perform the series of operations on the subsequent set of data. Once the identified operations are performed, a notification 50 may be generated to indicate whether the operations were successful.

For example, to generate a report using the data analysis software 38, it may be necessary to perform the following sequence of operations: 1) export data from the data analysis software 38 to the database software 40; 2) execute one or more database operations 48 to update the data; 3) import the updated data from the database software 40 to the data analysis software 38, and 4) execute one or more data analysis operations 46 to generate the report. The automated application interface 32 may, for example, be used to identify a sequence in which template data stores 49 associated with each of these operations need to be performed in order to automatically generate a report for the subsequent set of data.

Figure 2:
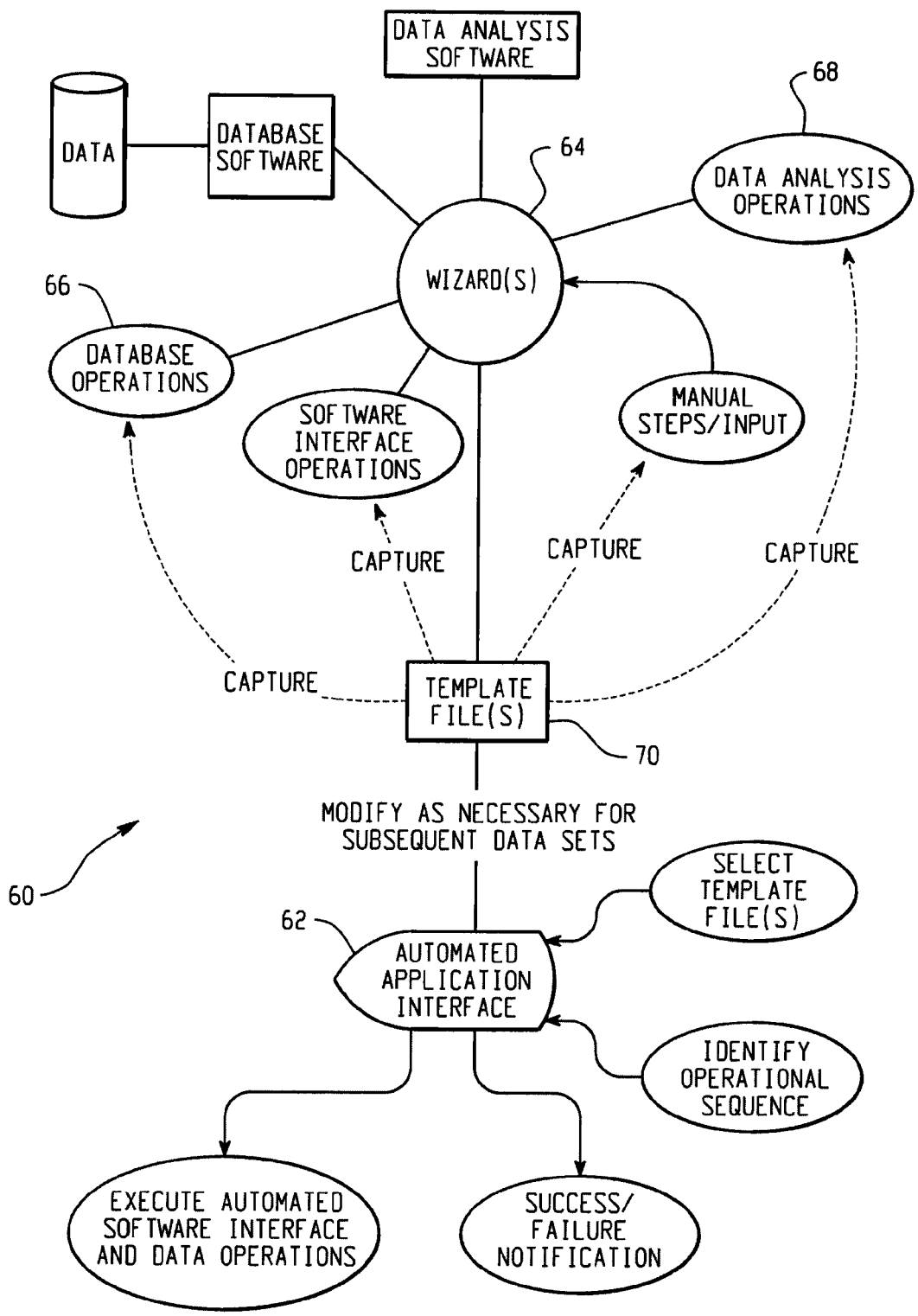
FIG. 2 is a block diagram depicting another example system for providing an automated application interface.

FIG. 2 is a block diagram depicting another example system 60 for providing an automated application interface 62. This example 60 illustrates that one or more wizards 64 may also be used to perform the database operations and/or the data analysis operations 68, and to capture information associated with these operations 66, 68 in the one or more template data stores 70.

Figure 3:
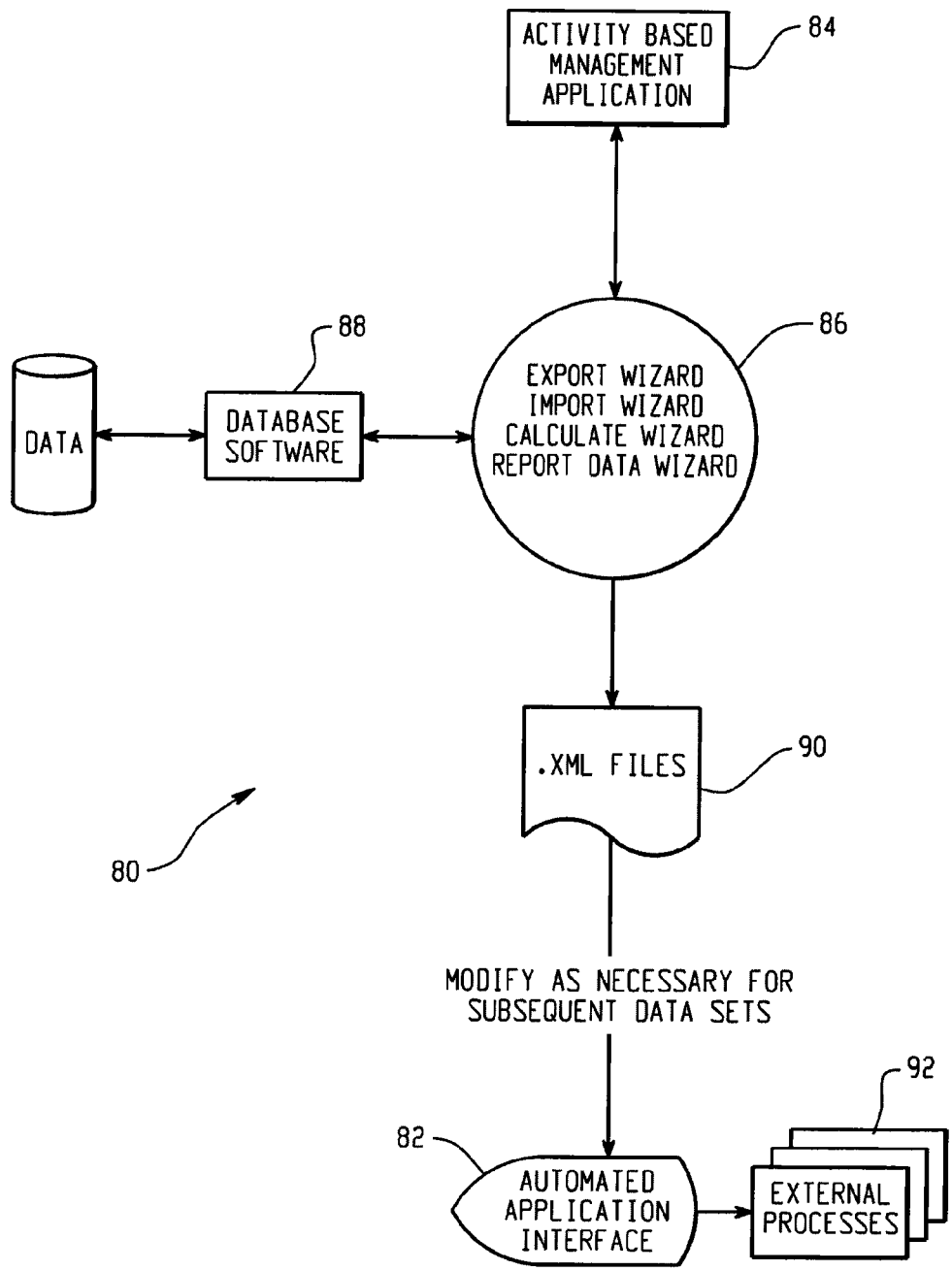
FIG. 3 is a block diagram depicting an example system for providing an automated application interface for an activity based management (ABM) software application.

FIG. 3 is a block diagram depicting an example system 80 for providing an automated application interface 82 for an activity based management (ABM) software application 84. This example 80 illustrates a plurality of wizards 86 that may be used to perform operations using the ABM software application 84 and/or a database software application 88. For example, an export wizard may be provided to export data from the ABM software 84 to the database software, an import wizard may be provided to import data from the database software 88 to the ABM software 84, a calculate wizard may be provided to perform a data analysis operation using the ABM software, and a report data wizard may be provided to generate a report using the ABM software. Other wizards may also be provided.

In addition to performing specific ABM and/or database software operations, the wizards 86 generate one or more XML files 90, which are used by the automated application interface 82 to automatically perform a sequence of operations on subsequent data sets. In order to automatically repeat a sequence of operations for subsequent data, the XML files are modified, as necessary, to identify the subsequent set of data, and a sequence for performing the operations is identified using the automated application interface 82. The automated application interface 82 then performs the operations by executing the XML files in the identified sequence.

Figure 4:
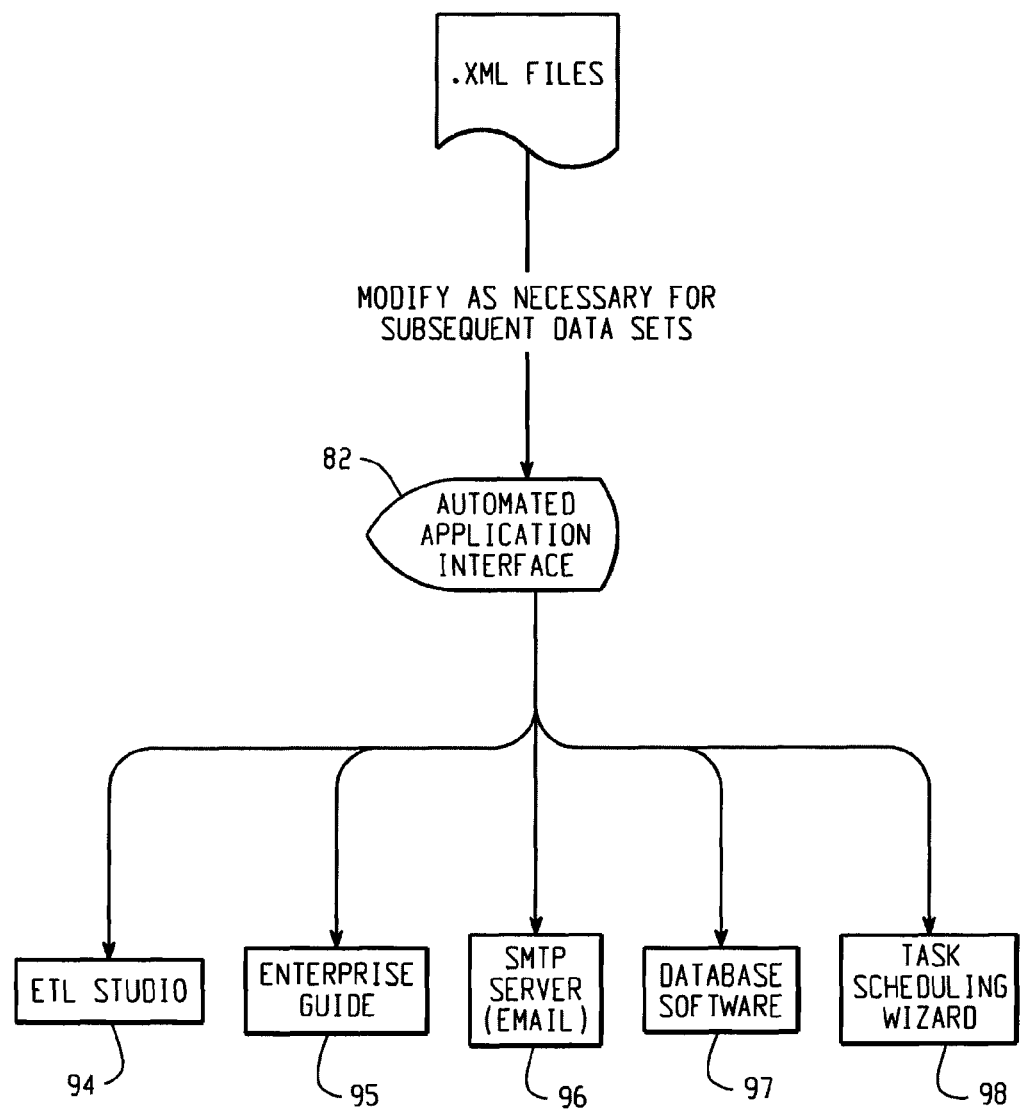
FIG. 4 depicts example external processes that may be accessed by the automated application interface.

Also illustrated in FIG. 3 are a plurality of external processes 92 that the automated application interface 82 may access to perform the designated operations and/or other functions. Some example external processes 94-98 that may be accessed by the automated application interface 82 are illustrated in FIG. 4. For instance, the automated application interface 82 may provide an email notification using an SMTP server 96 to indicate whether the automated sequence of operations were performed successfully. In another example, a task scheduling wizard 98 may be used in conjunction with the automated application interface 82 to schedule a date and time at which the automated sequence of operations are to be performed by the automated application interface 82.

Figure 5:
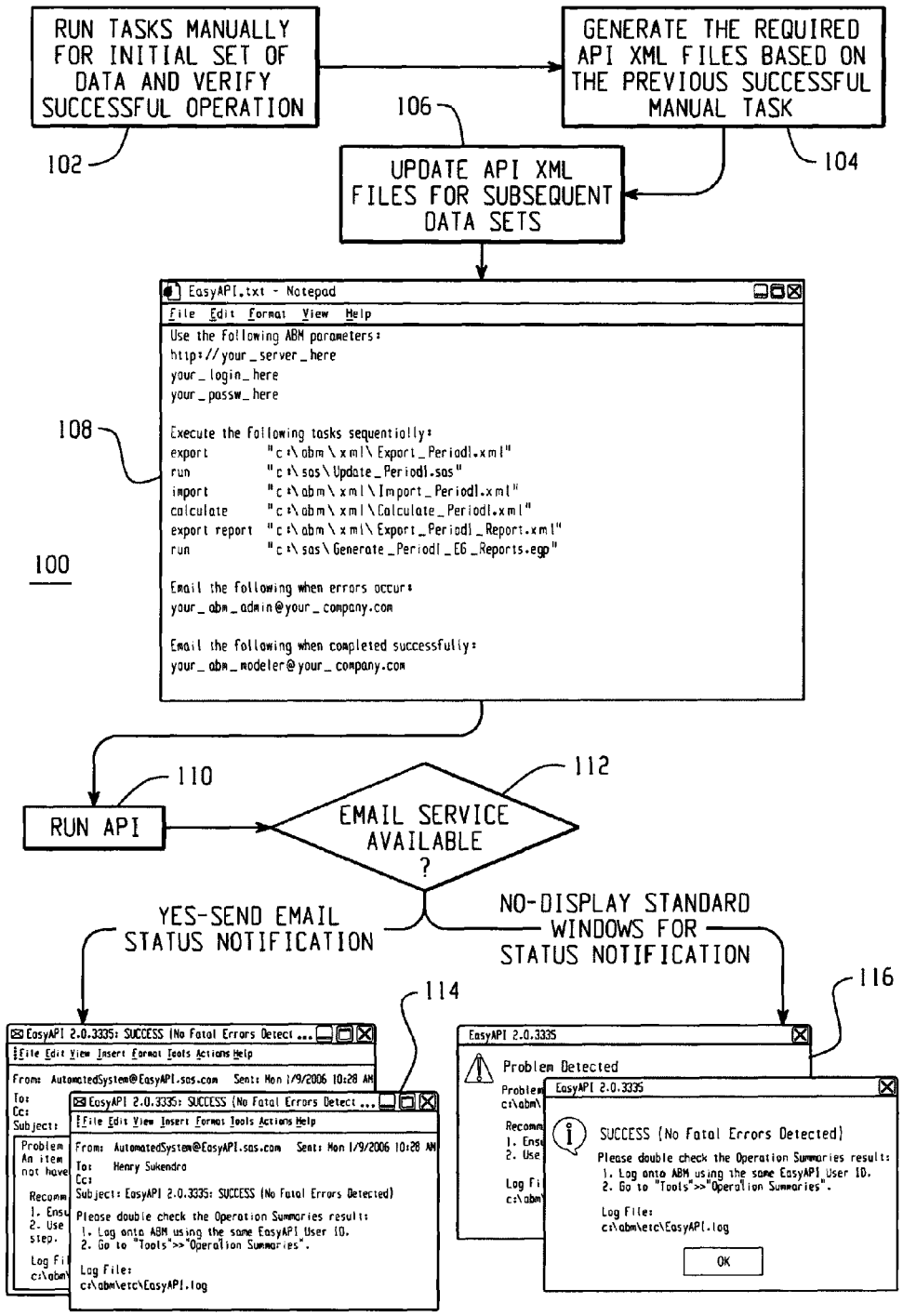
FIG. 5 is a process flow diagram depicting an example method for providing an automated application interface.

FIG. 5 is a process flow diagram 100 depicting an example method for providing an automated application interface. In step 102, a series of software operations are performed manually for an initial set of data and the results of the operations are verified to ensure that they are performed successfully. For instance, one or more software interface, data analysis and/or database operations may be performed on the initial set of data, and one or more wizards may be used to assist in the manual performance of one or more of the operations. In step 104, API XML files and/or other template files are generated for each of the operations that are successfully performed in step 102. The API XML files or other template files may, for example, be automatically generated during the performance of step 102.

In order to automate the operations performed manually in step 102, one or more of the XML and/or other template files are updated in step 106 to identify a subsequent set of data. In step 108, an automated application interface is used to select the XML or other template files for execution and to identify the sequence in which the files are to be executed. As illustrated, the automated application interface may be in the form of a text editor, eliminating the need for expensive and complex programming software. In the illustrated example, the automated application interface utilizes a text file referred to as "EasyAPI." The illustrated "EasyAPI" file identifies six example operations (export, run, import, calculate, export report and run) and their respective XML or other template files specific to an activity based management (ABM) software application. The example ABM-based operation commands and their functions are described in following table.

| Command | Function |
| --- | --- |
| Export<br>"c:\abm\xml\your_export.xml" | Export model data. |
| Run<br>"c:\sas\your_sas_batch.sas" | Execute external processes (e.g., SAS Batches, vbscripts, etc.) |
| Import<br>"c:\abm\xml\your_import.xml" | Import model data. |
| Calculate<br>"c:\abm\xml\your_calculate.xml" | Calculate and/or generate cubes. |
| Export Report<br>"c:\abm\xml\your_export_report.xml" | Export report data. |

It should be understood, however, that the automated application interface may be used with other types of software applications in addition to activity based management (ABM) software. In addition, interface types other than a text editor could also be used for the automated application interface. For instance, in one example, the automated application interface commands and their sequence could be selected using a graphical user interface.

With reference again to FIG. 5, the operations identified in the automated application interface are executed in their identified sequence at step 110. At step 112, the method determines if an email service is available to the automated application interface. For example, the automated application interface may determine if it is has access to an SMTP server. If email service is available, then a status notification is generated at step 114 in the form of an email message that indicates whether the identified operations were successfully performed. Else, if email service is not available, then an alternative status notification is generated in step 116, for instance in the form of a pop-up window.

It should be understood that similar to the other processing flows described herein, one or more of the steps and the order in the flowchart may be altered, deleted, modified and/or augmented and still achieve the desired outcome.

FIGS. 6-25 are screen shots showing an example of how reports may be generated with activity based management (ABM) software using an automated application interface. FIGS. 6-21 show an example of the manual steps for generating the report for an initial set of data. FIG. 22-25 show how an example automated application interface in the form of a text file may be used to automatically perform the sequence of operations to generate the same ABM report for a subsequent set of data.

Figure 6:
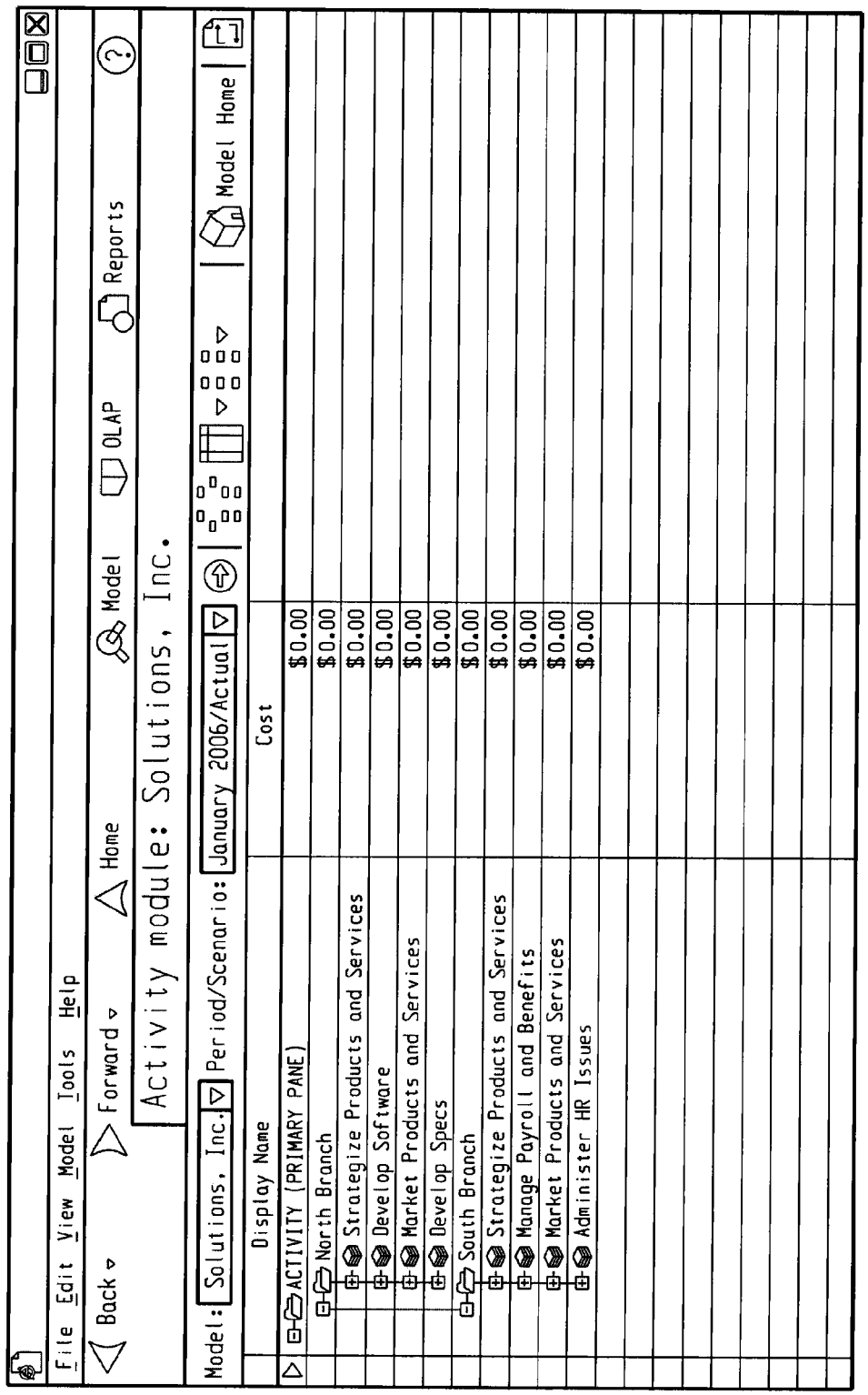
Figure 7:
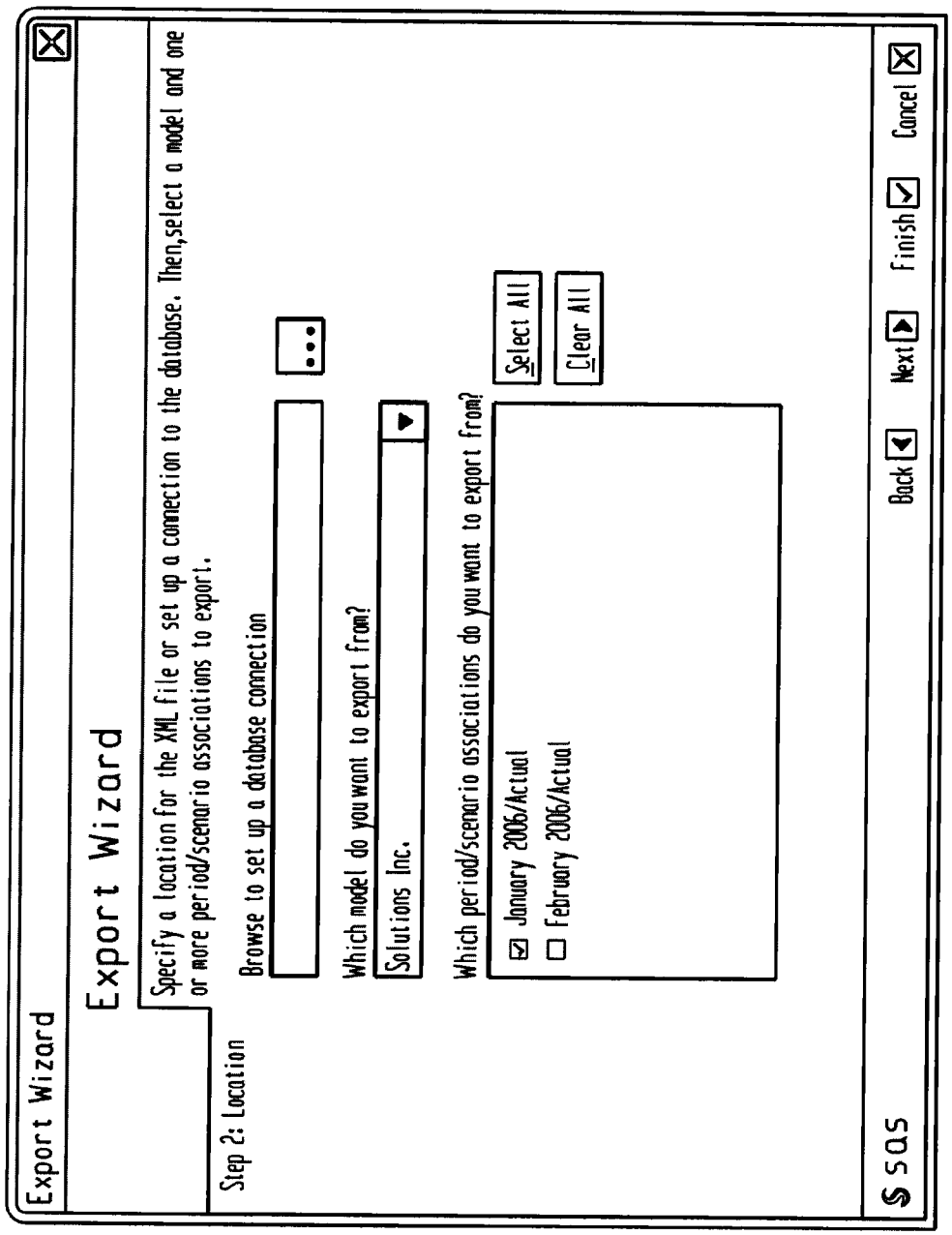
Figure 8:
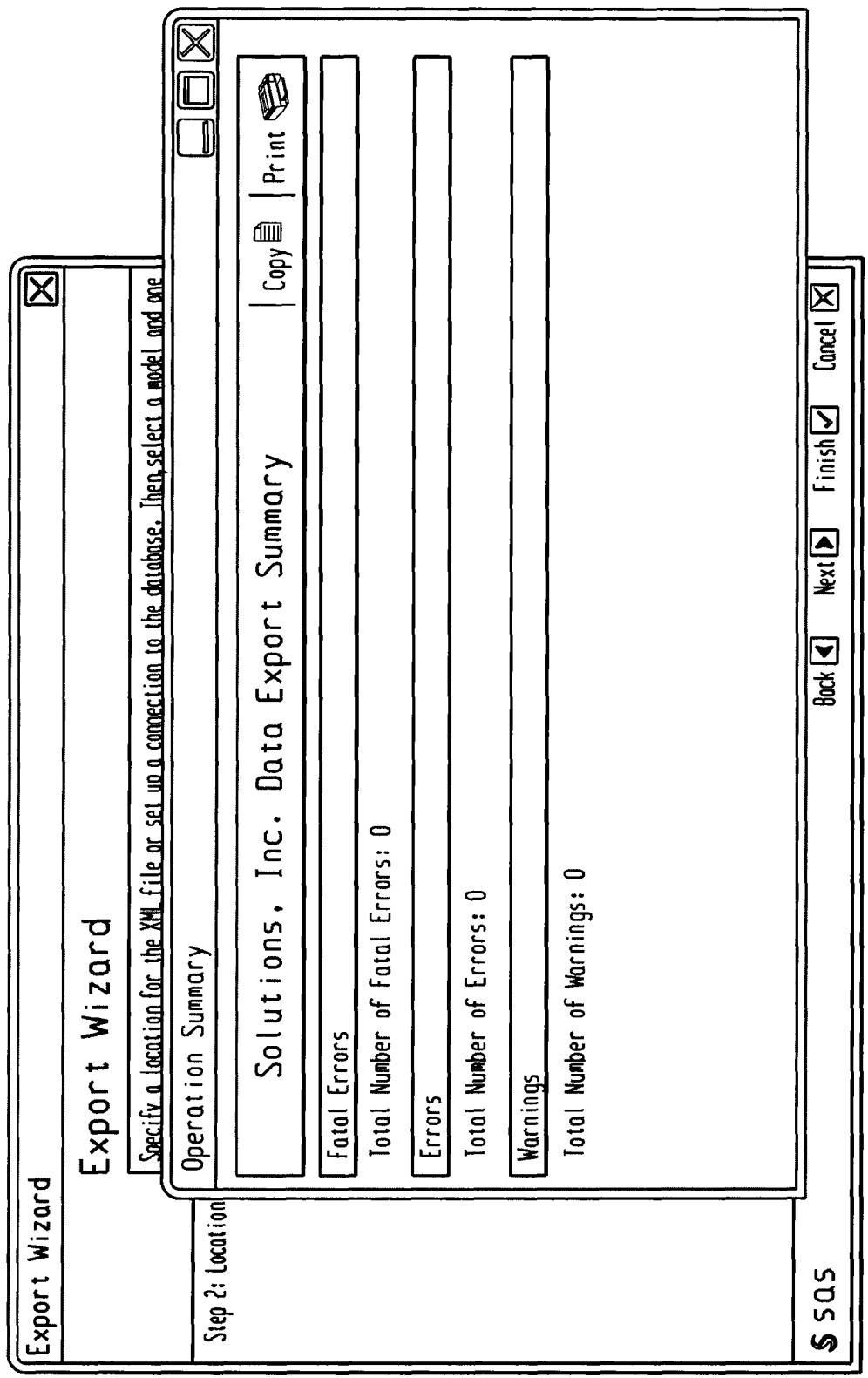
Figure 9:
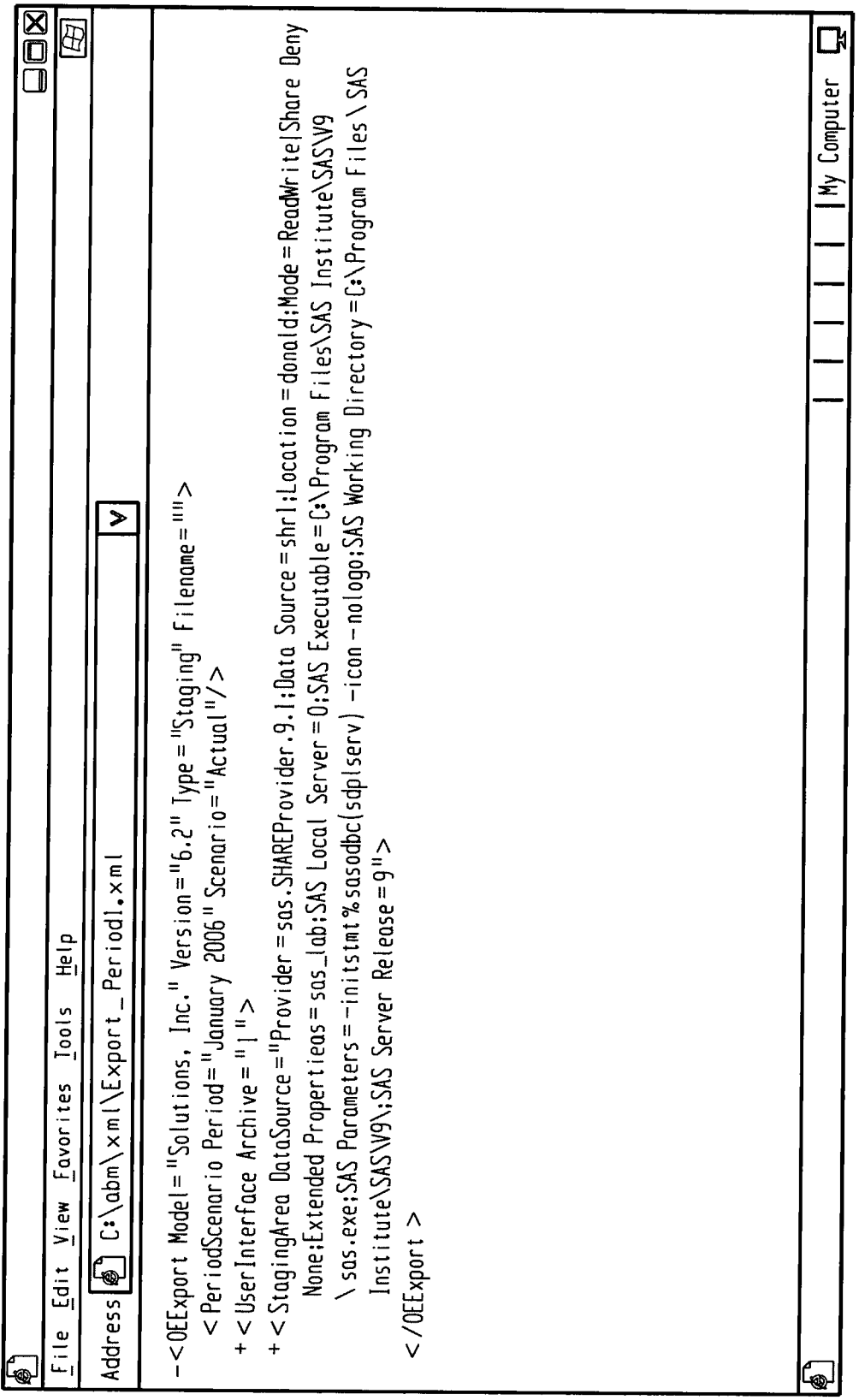

FIG. 6 depicts an example data model created using an ABM software application. The example model is for a fictitious company, Solutions, Inc., and includes model data to associate costs with specific categories of activities performed at two different company locations. Note that the example ABM model depicted in FIG. 6 is for the January 2006 period and lists $0 for all activities. The model includes $0 values because the model data (e.g., salary and labor hours) needs to be updated from an ERP system (e.g., SAP, Oracle, etc.) To update the model data, an export wizard is used to export the January 2006 tables to the database software, as illustrated in FIG. 7. The success of the export operation is then verified, as illustrated in FIG. 8. In addition, the export wizard generates an XML file, as illustrated in FIG. 9, which may later be used in connection with the automated application interface to automatically perform the export operation for a subsequent set of data. The export XML file may, for example, be generated using Activity-Based Management software sold by SAS Institute Inc., or using other available software that may have other required fields.

FIG. 10 depicts an example database software application, which is used to obtain the model data for the January 2006 period from the database. For example, SAS Enterprise software may be used to obtain the January 2006 salary/labor hours from external ERP systems like SAP, Oracle or others. As illustrated in FIG. 10, the ABM model has been updated to replace the $0 values with actual cost values. In addition, the manual execution of the database software operation illustrated in FIG. 10 generates a batch file (e.g., a SAS batch job), which may later be used in connection with the automated application interface to automatically perform the database operation(s) on a subsequent set of data. The batch file may, for example, contain SQL/Datastep codes used to obtain data values from the database.

Figure 11:
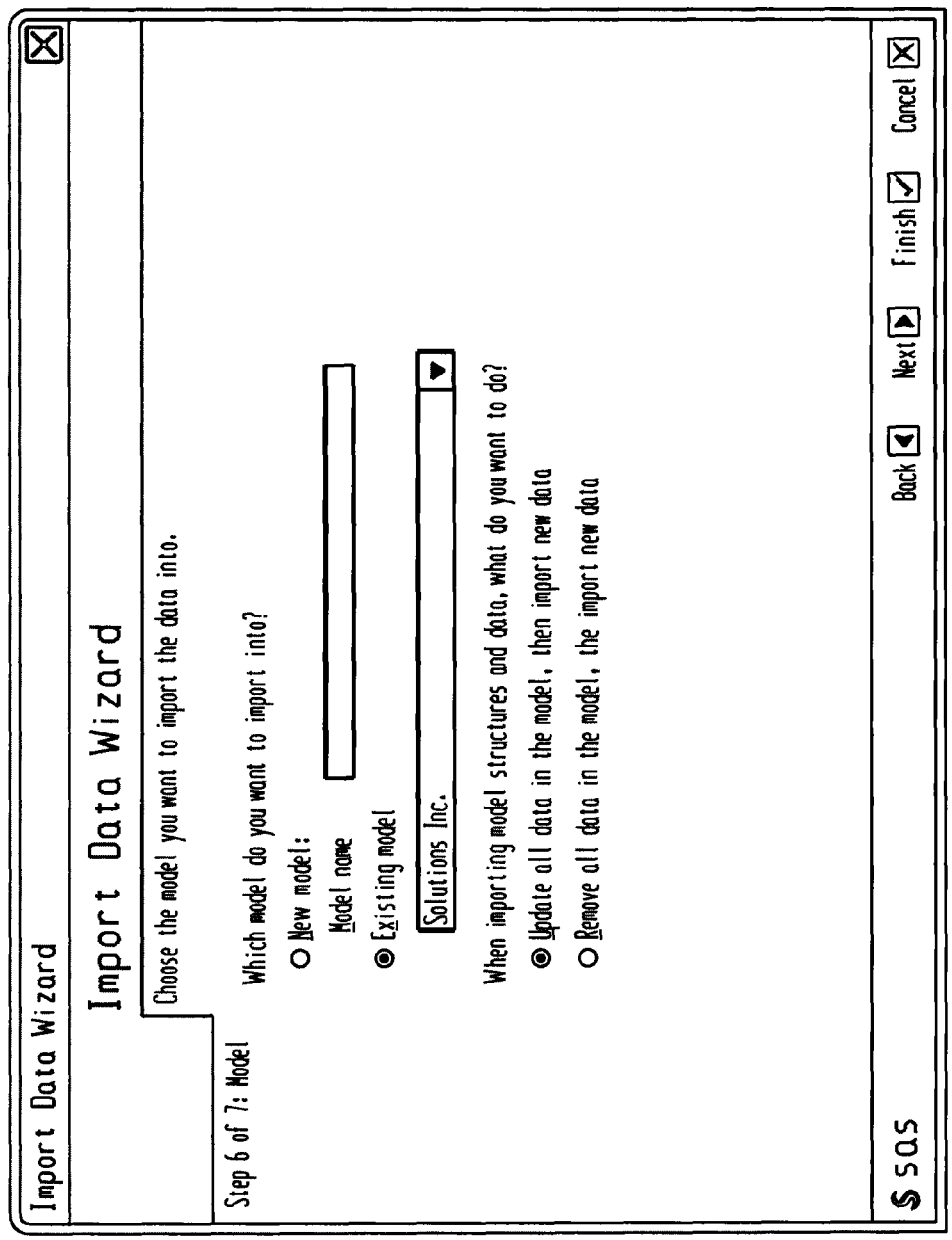
Figure 12:
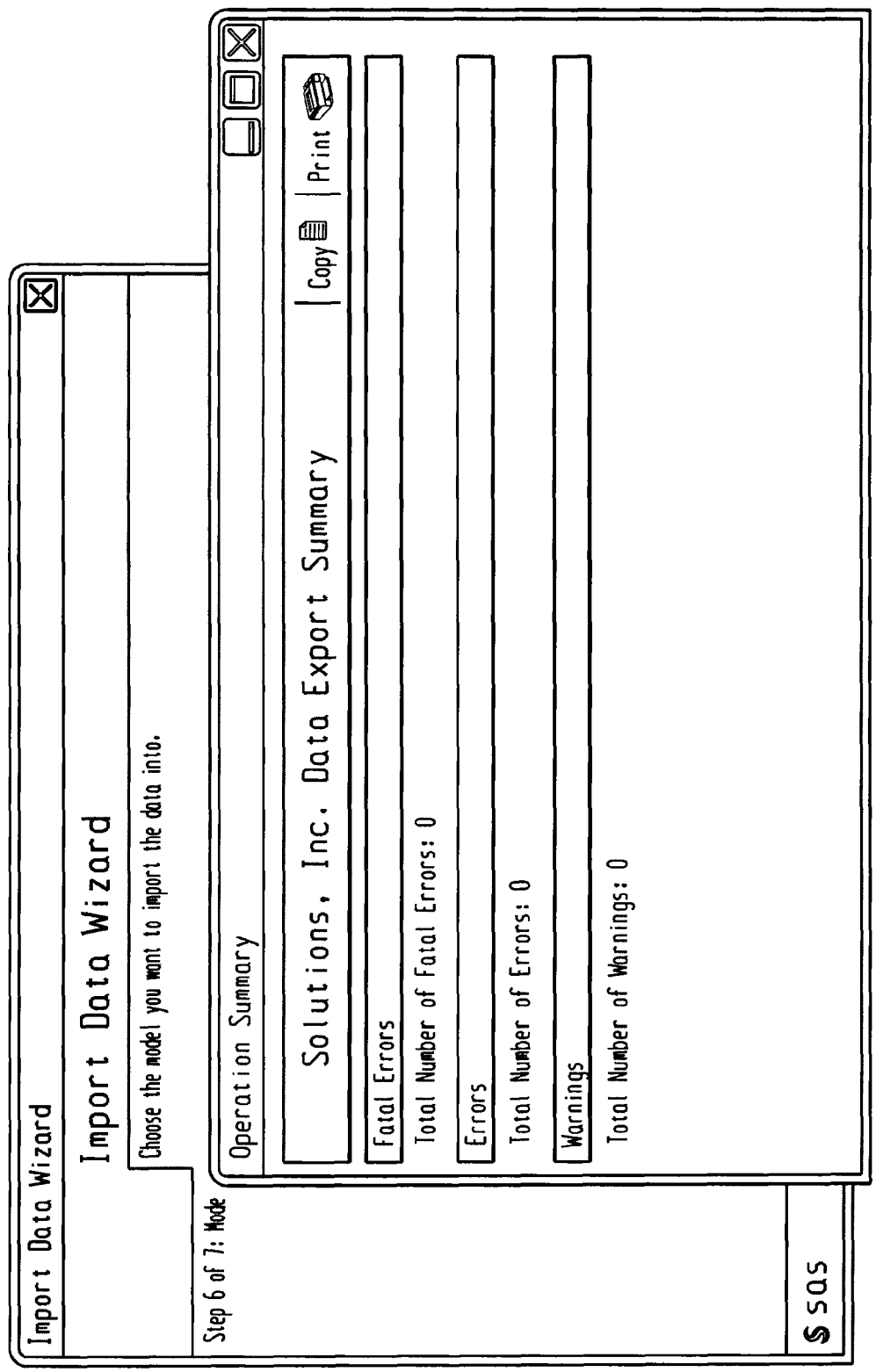
Figure 13:
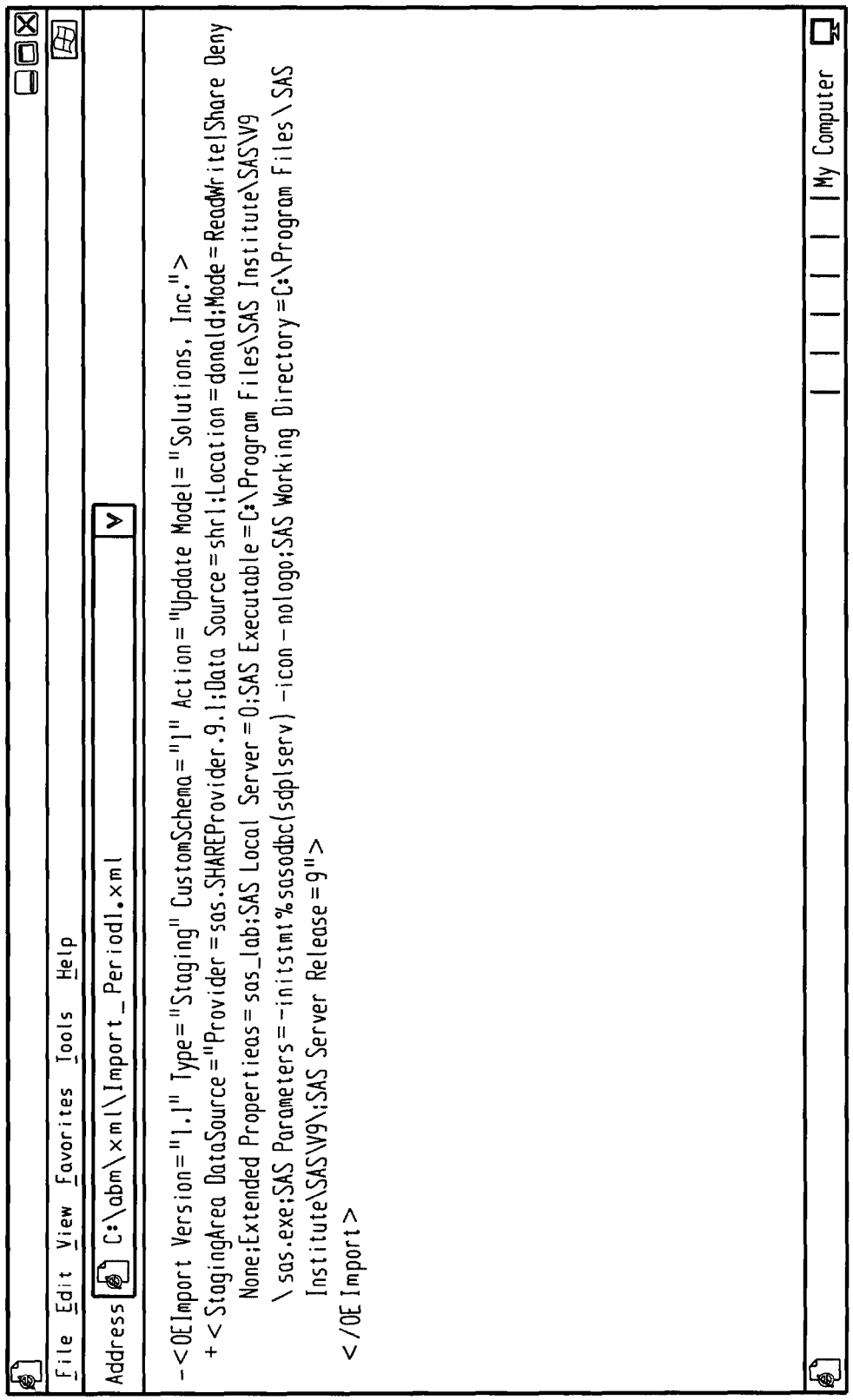

As illustrated in FIG. 11, the updated January 2006 tables are imported back to the ABM software using an import data wizard. The success of the import operation is then verified, as illustrated in FIG. 12. In addition, the manual operation using the import data wizard generates an XML file, as illustrated in FIG. 13, which may later be used in connection with the automated application interface to automatically perform the import operation for a subsequent set of data. The import XML file may, for example, be generated using Activity-Based Management software sold by SAS Institute Inc., or using other available software that may have other required fields.

Figure 14:
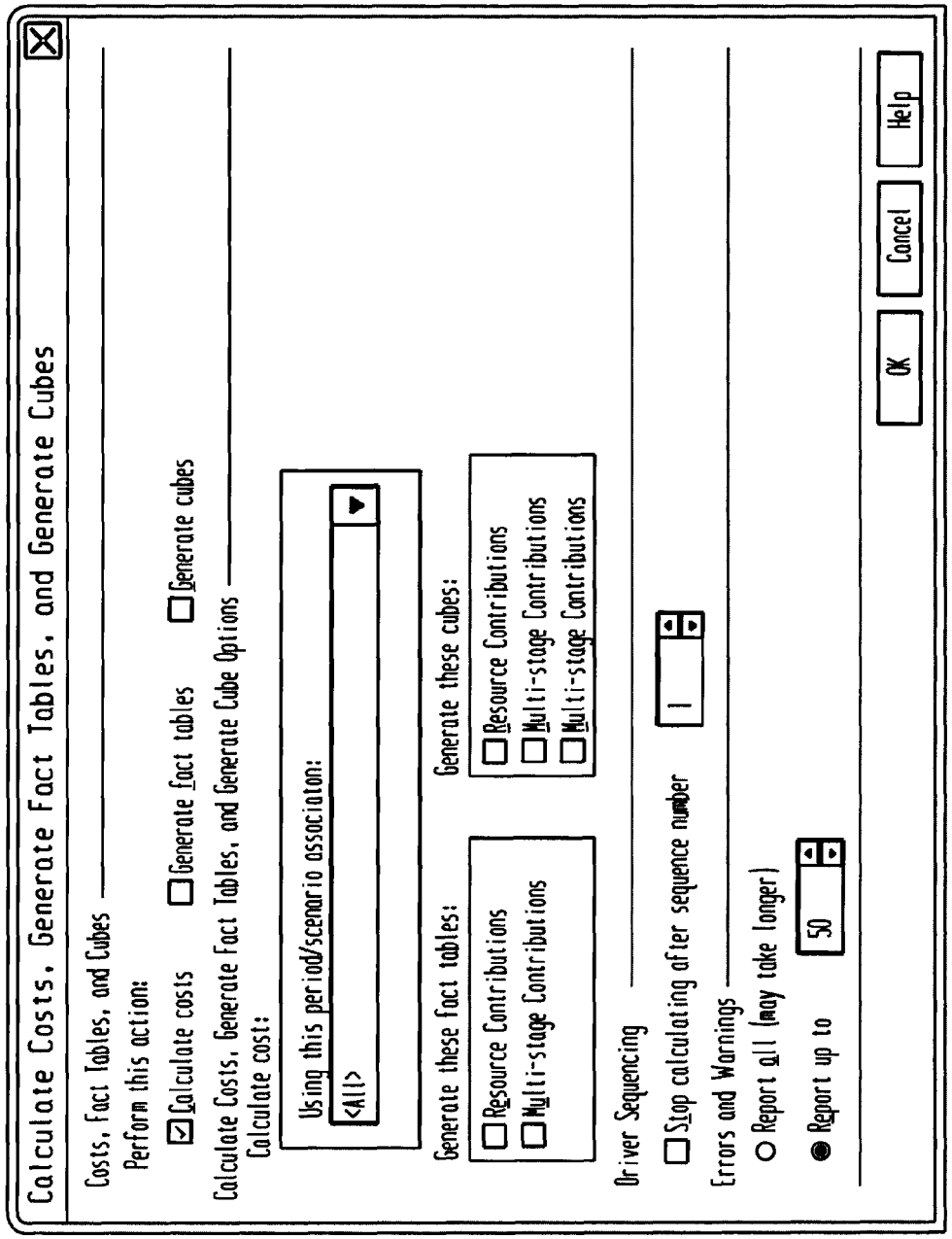
Figure 15:
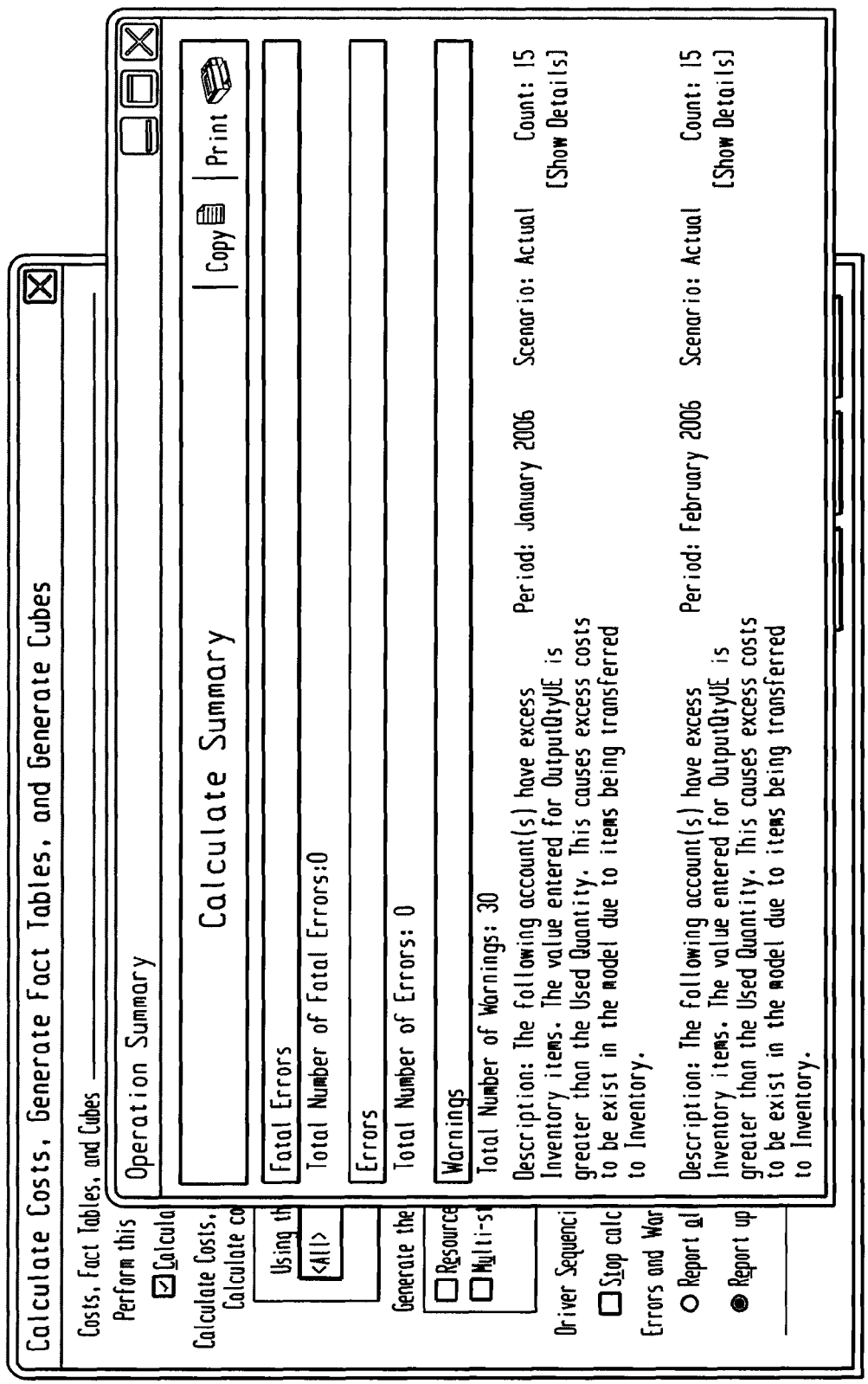
Figure 16:
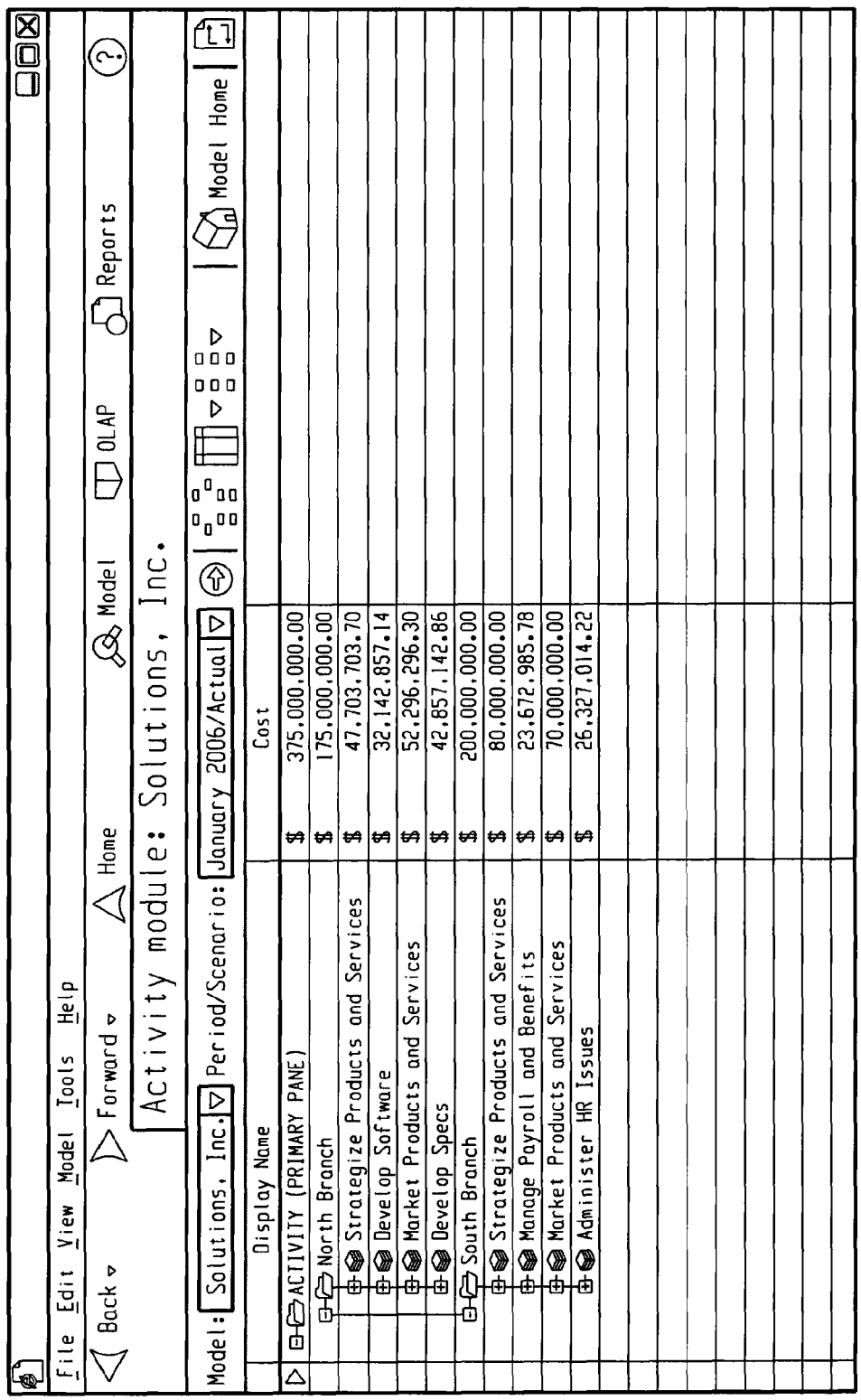
Figure 17:
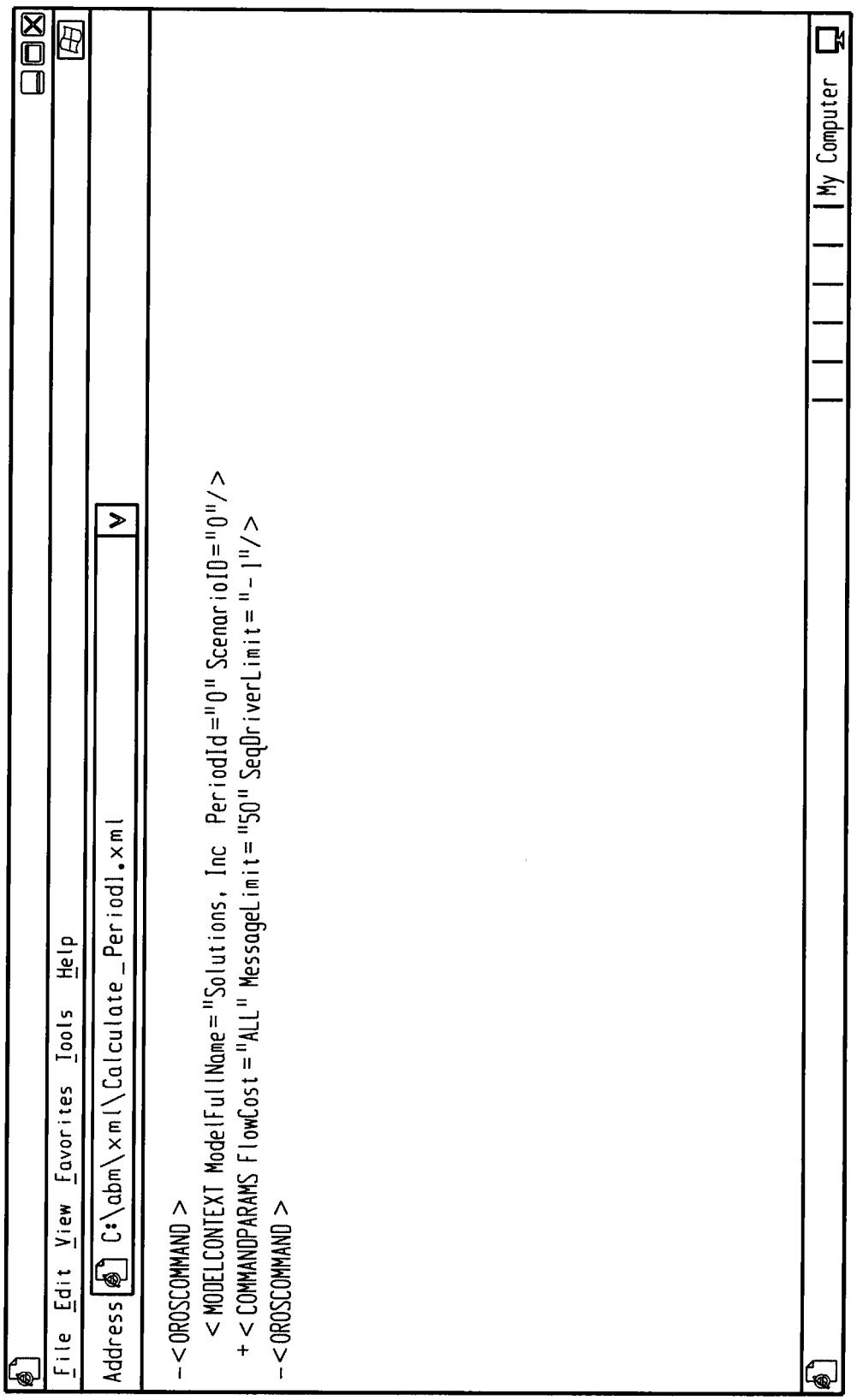

FIG. 14 depicts an example ABM calculate operation, which is performed to calculate cost data using the updated January 2006 tables. The success of the ABM calculate operation is then verified, as illustrated in FIG. 15. The operation summary depicted in FIG. 15 shows that the operation was completed with no errors. As illustrated in FIG. 16, the ABM model for the January 2006 period now includes the calculated cost values. In addition, the manual execution of the ABM operation generates an XML file, as illustrated in FIG. 17, which may later be used in connection with the automated application interface to automatically perform the ABM operation on a subsequent set of data. The calculate XML file may, for example, be generated using Activity-Based Management software sold by SAS Institute Inc., or using other available software that may have other required fields.

Figure 18:
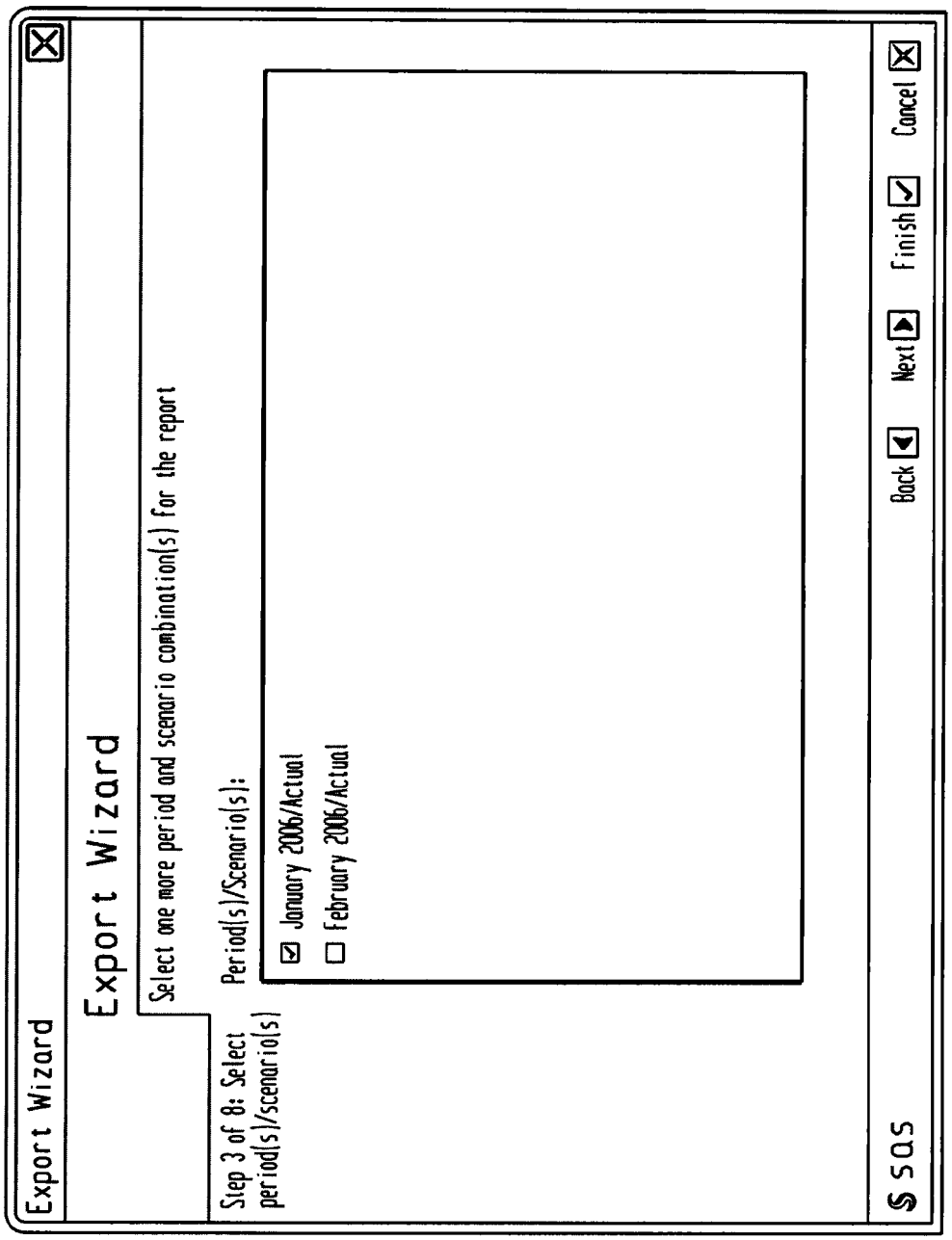
Figure 19:
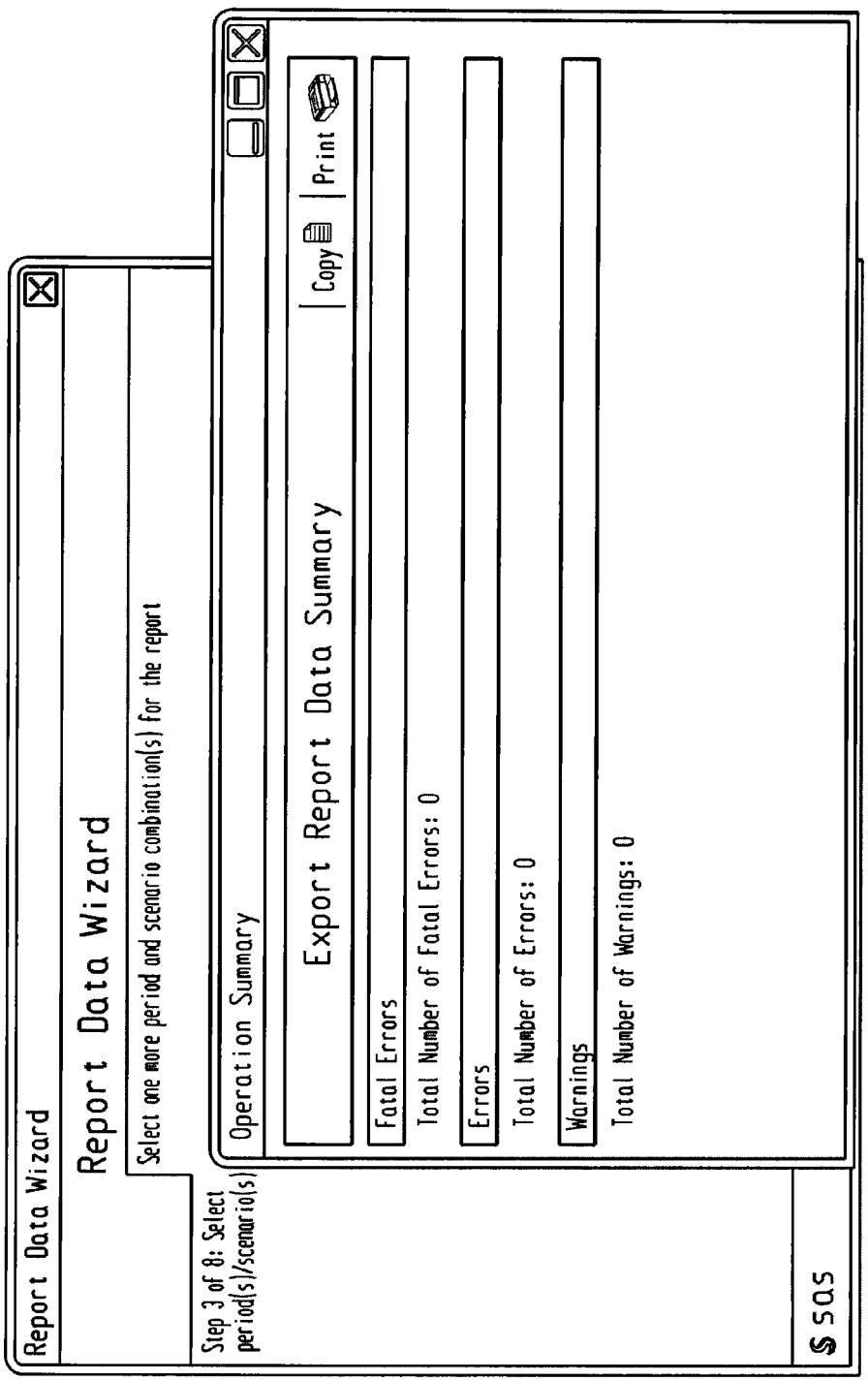
Figure 20:
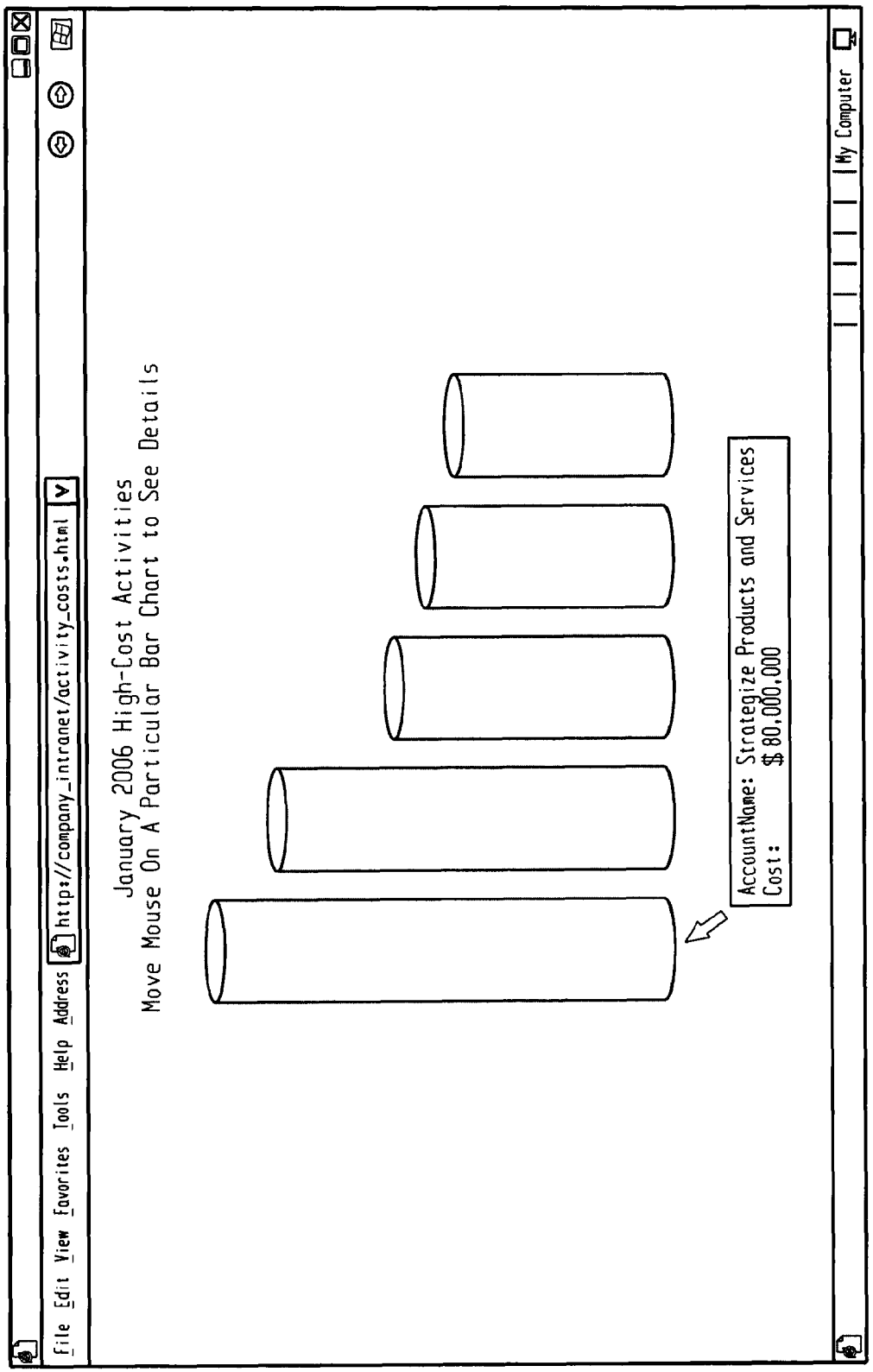
Figure 21:
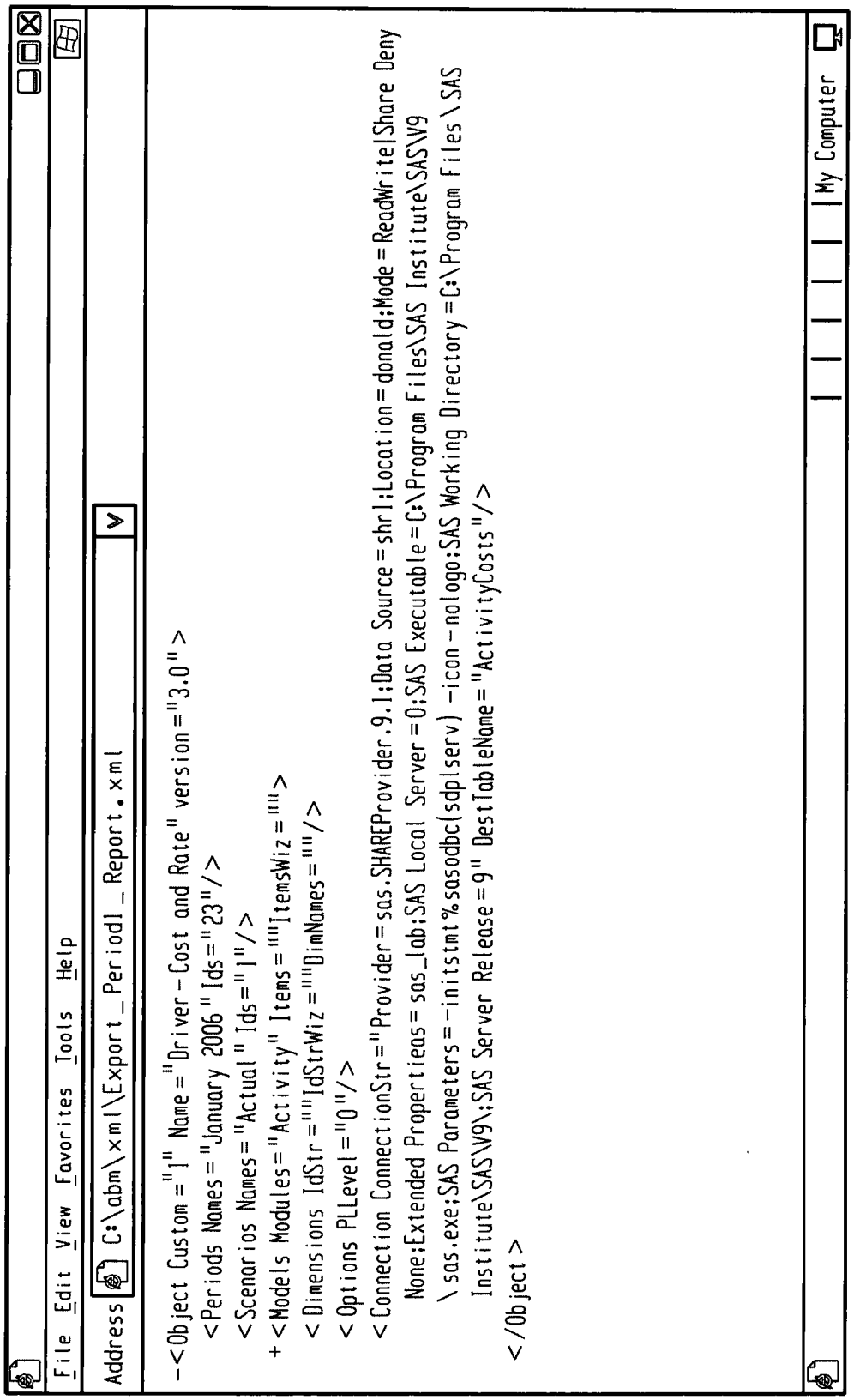

With the actual values calculated for the January 2006 tables, an ABM report may be generated using a report data wizard, as illustrated in FIG. 18. The success of the report generation operation is verified, as illustrated in FIG. 19, and a report for the January 2006 activities is generated, as illustrated in FIG. 20. In addition, the report data wizard generates an XML file, as illustrated in FIG. 21, which may later be used in connection with the automated application interface to automatically perform the report generation operation for a subsequent set of data. The report XML file may, for example, be generated using Activity-Based Management software sold by SAS Institute Inc., or using other available software that may have other required fields.

Figure 22:
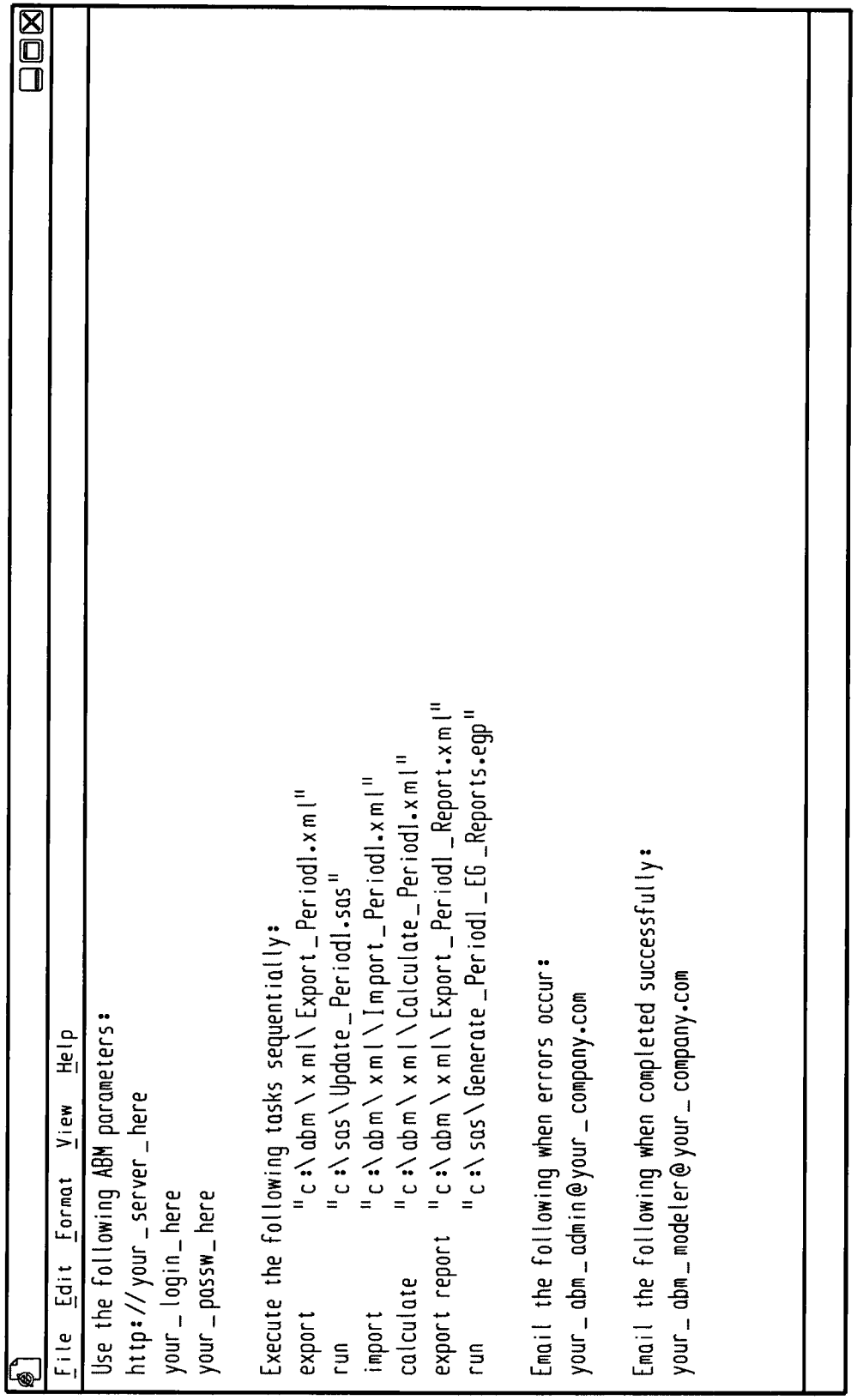
Figure 23:
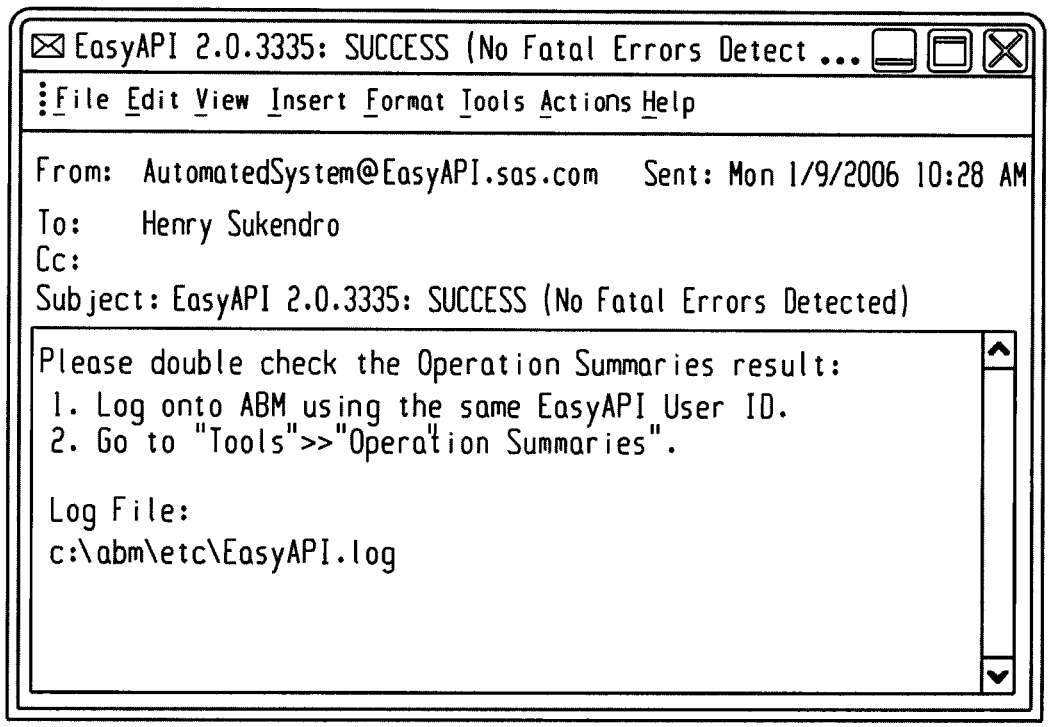
Figure 25:
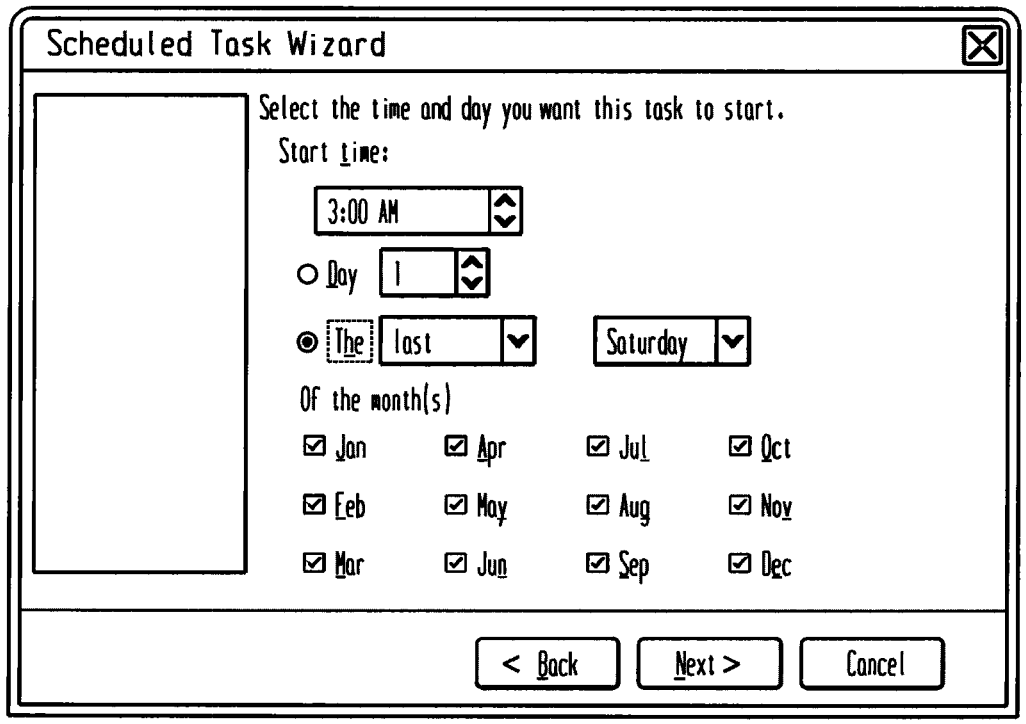
Figure 24:
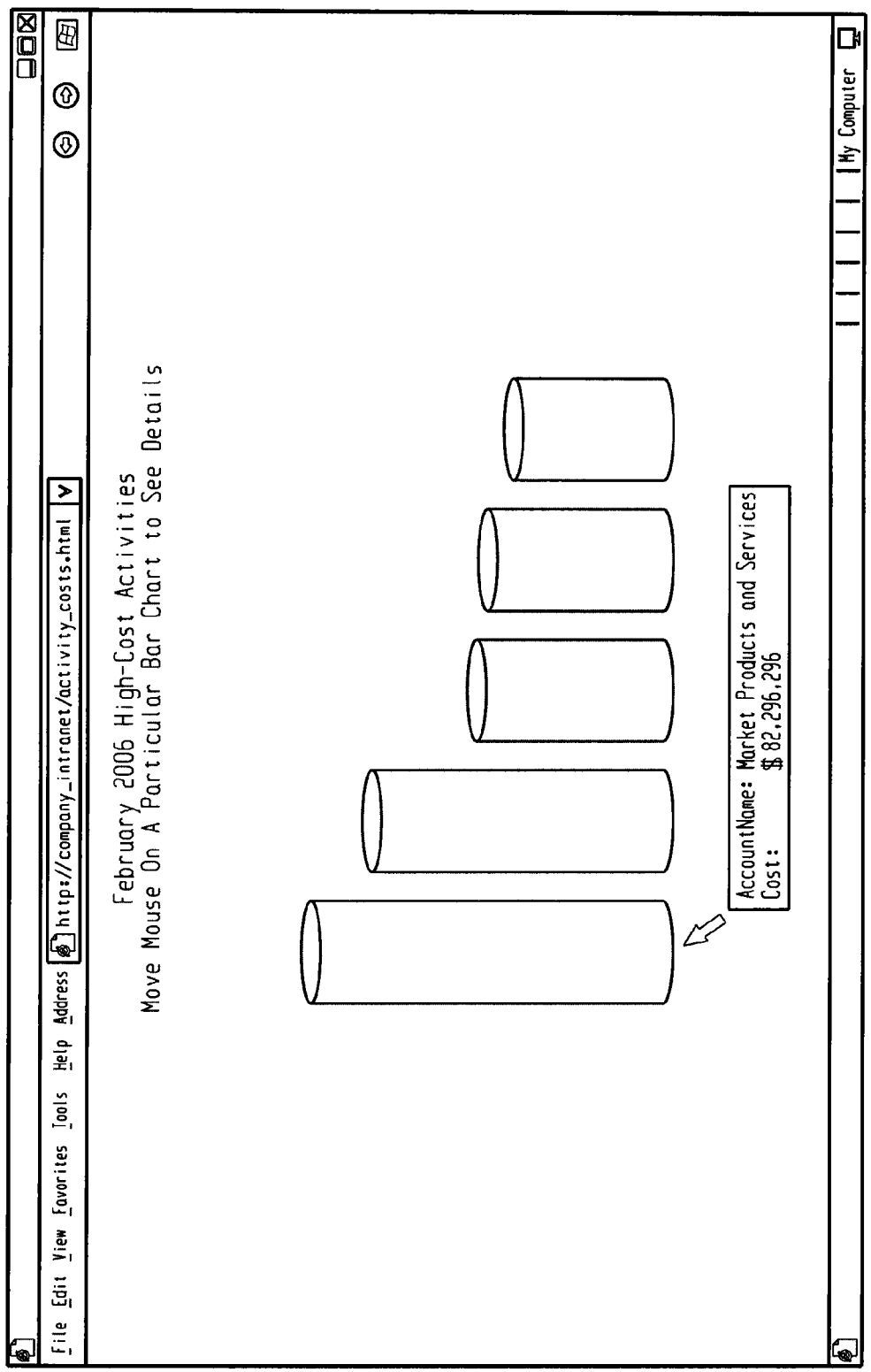

Once the sequence of manual operations depicted in FIGS. 6-21 have been successfully completed for the initial set of data, the automated application interface may be used to automatically perform the operations for subsequent sets of data, as illustrated in FIG. 22. The example automated application interface depicted in FIG. 22 utilizes a text file referred to as "EasyAPI," which identifies the operations (export, run, import, calculate, export report, run) to be performed on the subsequent set of data and also identifies the sequence of the operations. For example, the automated application interface may be used to automatically perform the sequence of operations to generate an ABM report for the February 2006 period. In order to generate the February 2006 report, the export XML file depicted in FIG. 9 is updated to replace "January 2006" with "February 2006" and the "EasyAPI" file depicted in FIG. 22 is executed. Each operation identified in the "EasyAPI" file will execute in the designated sequence to create the February 2006 report. Moreover, the successful performance of each individual operation has already been verified, and therefore the automated process is unlikely to result in a failure. Once the automated operations are completed, a status notification is generated, as illustrated in FIG. 23, and the February 2006 report is generated, as shown in FIG. 24. Notably, the use of the automated application interface for the subsequent set of data saves the user the significant amount of time typically required to perform the manual operations shown in FIGS. 6-21. In addition, the automated application interface may enable a user to schedule execution of the operations at a select time and date, for example using a schedule task wizard, as illustrated in FIG. 25.

Figure 26:
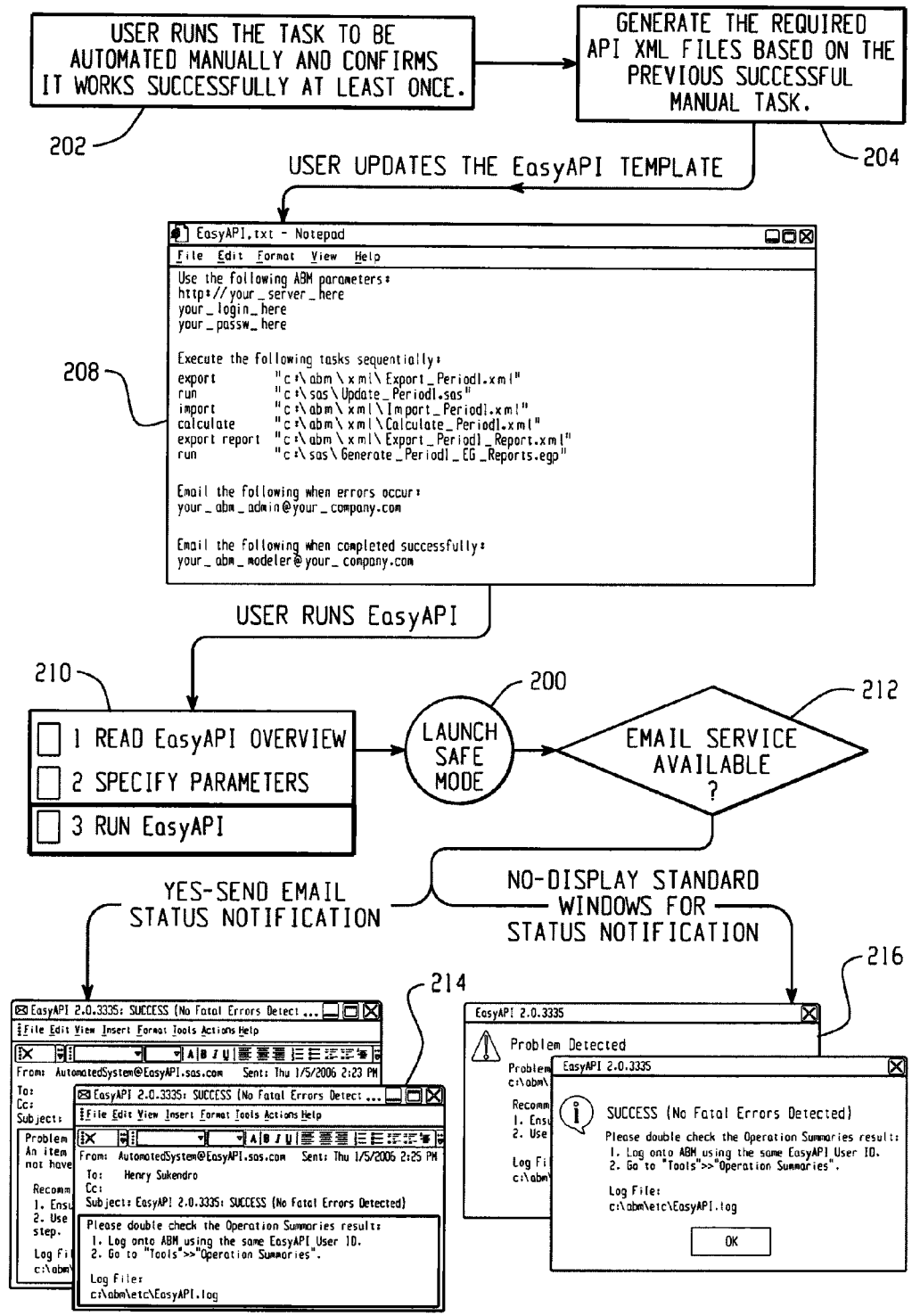
FIG. 26 is a process flow diagram depicting an example method for providing an automated application interface that includes safemode protection.

FIG. 26 is a process flow diagram depicting an example method for providing an automated application interface that includes safemode protection. The example method illustrated in FIG. 26 is similar to the method shown in FIG. 5, with the addition of a safemode program 200.

In step 202, a series of software operations are performed manually for an initial set of data and the results of the operations are verified to ensure that they are performed successfully. For instance, one or more software interface, data analysis and/or database operations may be performed on an initial set of data, and one or more wizards or other interfaces may be used to assist in the manual performance of one or more of the operations. In step 204, API XML files and/or other template files are generated for each of the operations that are successfully performed in step 202. The API XML files or other template files may, for example, be automatically generated during the performance of step 202. In addition, the method may, for example, prevent the automation of any task that fails to run successfully in step 202. In order to automate the operations performed manually in step 202, one or more of the XML and/or other template files (referred to in FIG. 26 as the EasyAPI Template) are updated to identify a subsequent set of data.

In step 208, an automated application interface is used to select the XML or other template files for execution and to identify the sequence in which the files are to be executed. As illustrated, the automated application interface may be in the form of a text editor, eliminating the need for expensive and complex programming software. In the illustrated example, the automated application interface utilizes a text file referred to as "EasyAPI." The illustrated "EasyAPI" file identifies example operations (export, run, import, calculate, export report and run) and their respective XML or other template files specific to an activity based management (ABM) software application. The "EasyAPI" file also identifies email addresses to send notifications in the event of an error and completion of the task sequence.

It should be understood, however, that the automated application interface may be used with other types of software applications in addition to activity based management (ABM) software. In addition, interface types other than a text editor could also be used for the automated application interface. For instance, in one example, the automated application interface commands and their sequence could be selected using a graphical user interface.

With reference again to FIG. 26, the operations identified in the automated application interface are executed in their identified sequence at step 210, for instance by a user selecting "Run EasyAPI" from a user interface menu. Then, at step 200 the safemode application is launched to help ensure that the sequence of tasks identified in the "EasyAPI" file are successfully executed in the event of a system malfunction. An example operation of the safemode application is described in more detail below with reference to FIG. 27.

At step 212, the method determines if an email service is available to the automated application interface. For example, the automated application interface may determine if it is has access to an SMTP server. If email service is available, then a status notification is generated at step 214 in the form of an email message that indicates whether the identified operations were successfully performed. Else, if email service is not available, then an alternative status notification is generated in step 216, for instance in the form of a pop-up window.

Figure 27:
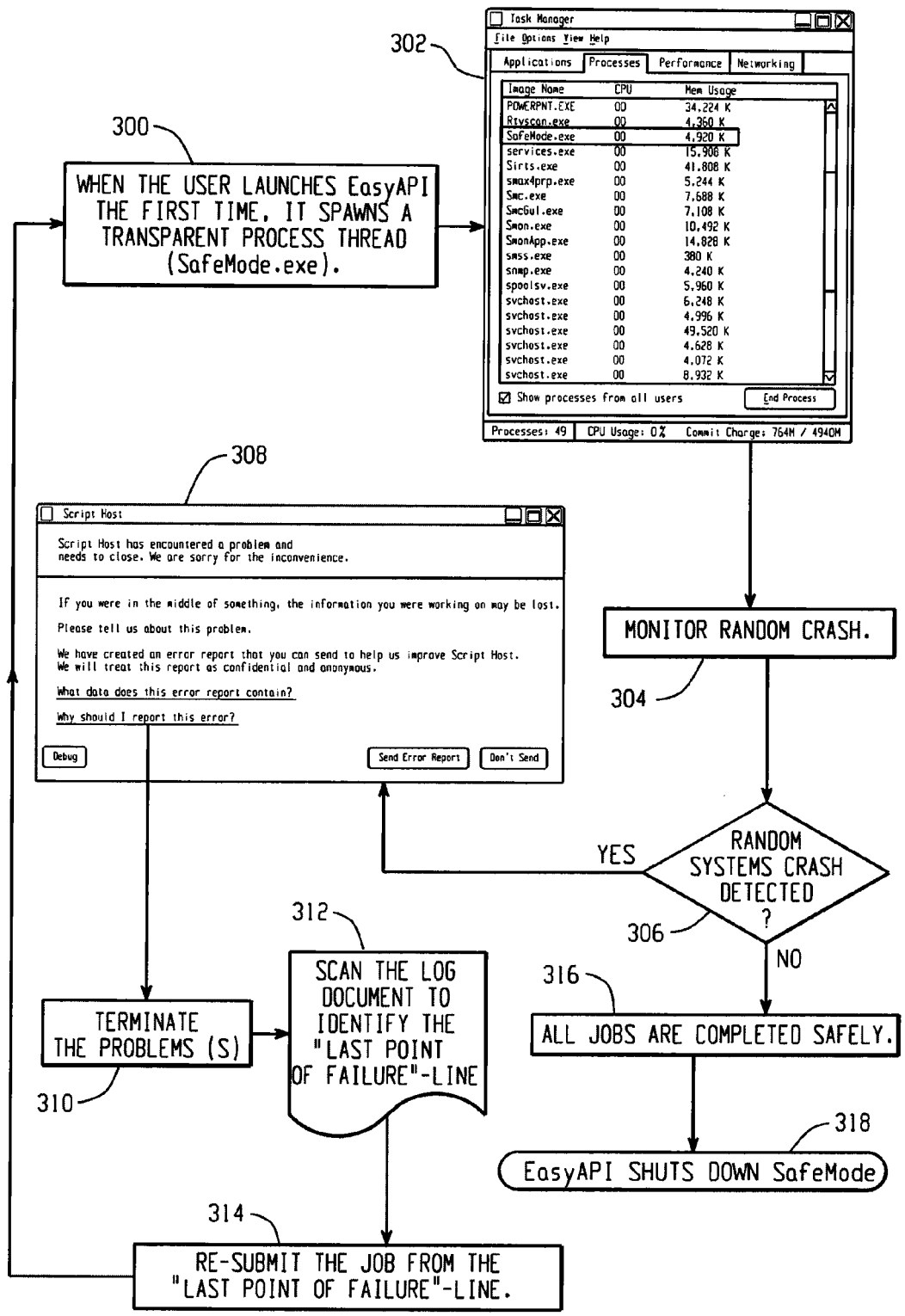
FIG. 27 is a flow diagram of the safemode program.

FIG. 27 is a flow diagram of the safemode program. The safemode program is launched in step 300. When the automated application interface (e.g., EasyAPI) is launched for the first time, it spawns a transparent safemode process thread (SafeMode.exe) that runs in the background. The safemode process thread is non-intrusive. In the illustrated example, the safemode process thread may only be seen by a user by accessing an operating system task manager, as shown at 302. During operation, as shown at step 304, the safemode process monitors for system failures, such as an operating system crash. A random crash may, for example, be caused by network, hardware, kernel or other system latency that is outside of the control of the automation framework provided by the automated application interface (e.g., EasyAPI).

The safemode program monitors for a system failure, such as a random crash, at step 306. For instance, the safemode program may monitor for a specified system failure indicator, such as the display of a "crash window." A crash window may, for example, be identified by monitoring for the display of a graphical window that includes specified text or a specified value. If a failure is detected, it is reported to the user at step 308, and then the safemode program automatically terminates the failed program or process at step 310. At step 312, the safemode program scans a log file to identify the "last point of failure" line in the terminated program or process. Then, at step 314, the job that had been running on the terminated program or process is resubmitted at the "last point of failure" line. In this way, the safemode program helps to prevent the redundancy of re-running successful jobs, enabling jobs to be completed in a "single shot" despite possible random system crashes. With reference again to step 306, if the safemode program does not detect a system failure, then the method proceeds to step 316, at which all jobs have been completed safely. After successful completion, the safemode program is shut down at step 318.

The following pseudocode provides a further illustration of an example operation of the safemode program:

```
monitor for crash window;
if crash window detected, then,
    terminate crash window;
    restart Easy API tread;
    if "safemode.txt" file exists, then resubmit job from last-point-of-
        failure ("safemode.txt" contains the last line of the EasyAPI.txt
        script that was being executed before the crash);
    if "safemode.txt" file does not exist, then resubmit job from the first
        line in the EasyAPI.txt script;
    terminate safemode thread;
    delete "safemode.txt" file.
```

Figure 28:
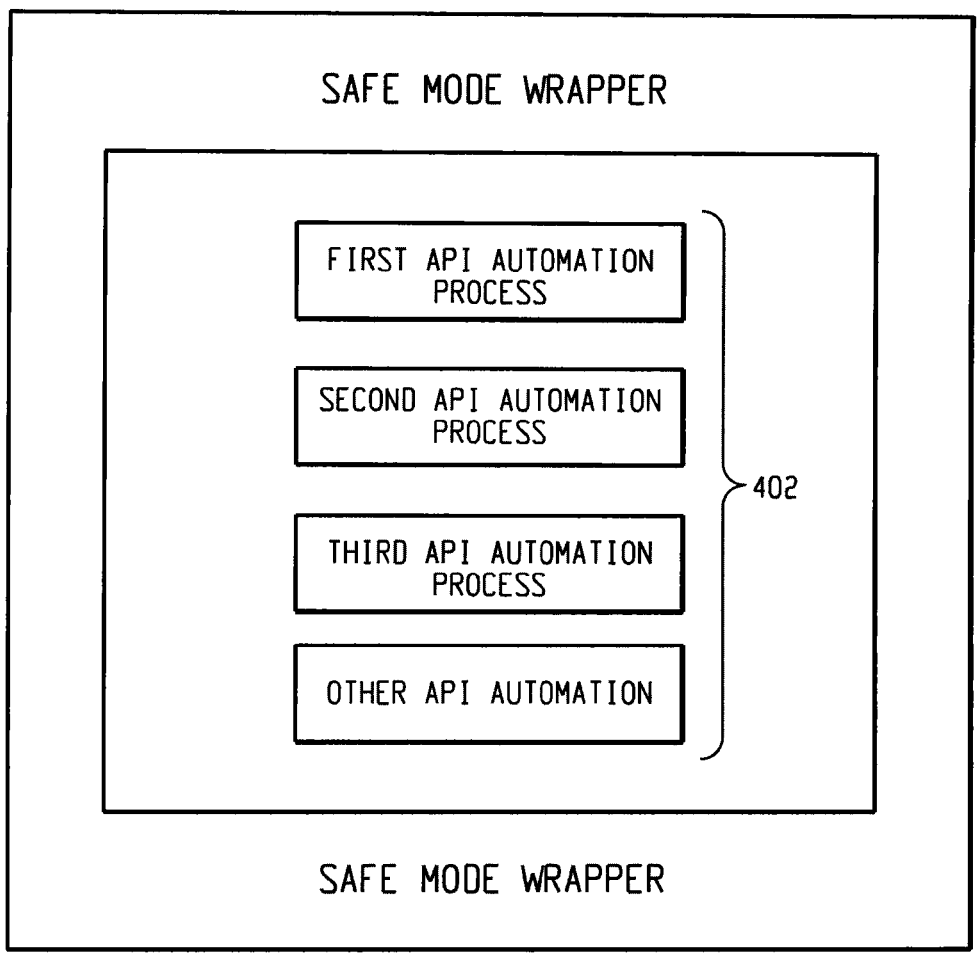
FIG. 28 is a diagram illustrating the operation of an automated application interface with safemode protection.

FIG. 28 is a diagram illustrating the operation of an automated application interface 400 with safemode protection. This diagram illustrates that the automated application interface 400 may be used as a user-friendly interface for automatically executing a sequence of tasks 402 all within the protection of the safemode program and for providing built-in email reporting. The sequence of tasks may include external processes that the automated application interface may access to perform the designated operations, for instance as illustrated in FIG. 4. In addition, as shown in FIG. 28, the sequence of tasks may also include templates for executing a number of different API automation procedures 402 on a current set of data. For instance, the sequence of tasks 402 automatically executed with the automated application interface 400 could include one or more of the API automation procedures or other application interface and data analysis procedures set forth in U.S. Patent Application Publication No. 2003/0061246 to Bowman et al, U.S. Patent Application Publication No. 2007/0028160 to Argo et al. and U.S. Patent Application Publication No. 2006/0136490 to Aggarwal et al.

As shown in FIG. 28, the automated application interface 400 may be implemented using a simple text editor that does not utilize complex Wizards or user interfaces and does not require programming knowledge (e.g., Java, C++, C#, etc.) or specialized programming tools (e.g., Eclipse, Visual Studio, etc.) In addition, the automated application interface may provide API automation as one sequential bundle with built-in email error-handling capability.

Figure 29:
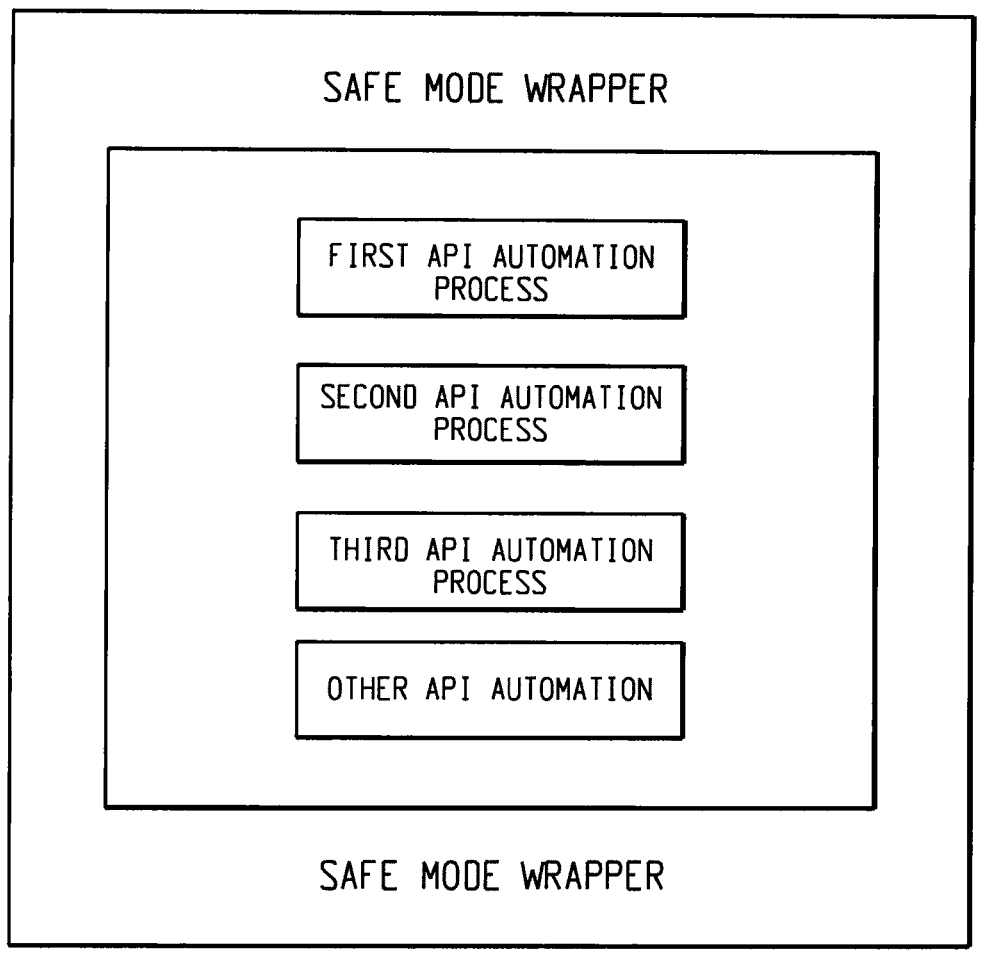
FIG. 29 is another diagram illustrating the operation of an automated application interface with safemode protection.

FIG. 29 is another diagram illustrating the operation of an automated application interface with safemode protection. This example illustrates how the commands of the automated application interface may be easily replaced with commands of a different language. This is due to the simplicity of the "plain language" commands that may be utilized by the automated application interface (e.g., EasyAPI). For example, the plain language commands may be "localized" to a particular language using a lookup table that maps the available commands to local language commands (e.g., mapping the command "run" to a French local language command "executer".) In addition, the entire script of the automated application interface may be translated, as illustrated in the example shown in FIG. 29.

This written description uses examples to disclose the invention, including the best mode, and also to enable a person skilled in the art to make and use the invention. The patentable scope of the invention may include other examples that occur to those skilled in the art.

It is further noted that the systems and methods described herein may be implemented on various types of computer architectures, such as for example on a single general purpose computer or workstation, or on a networked system, or in a client-server configuration, or in an application service provider configuration.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or even appropriately designed hardware configured to carry out the methods and systems described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It is claimed:

1. A method for providing an automated application interface, comprising:
   receiving a first set of data;
   receiving a first input to perform one or more software interface operations to manipulate the first set of data between data analysis software and database software;
   capturing information associated with the first input;
   using the captured information to automatically generate and store a template for each software interface operation successfully performed;
   receiving an update to one or more of the templates to identify a subsequent set of data;
   receiving a second input that includes textual information identifying an execution sequence for the templates;
   automatically executing the templates in the identified sequence to perform software interface and data analysis operations on the subsequent set of data;
   during execution of the one or more software interface and data analysis operations, monitoring for a system failure; and
   upon detection of a system failure, automatically terminating a failed operation and identifying a point of failure in the failed operation.

2. The method of claim 1, further comprising:
   performing a remaining portion of the software interface and data analysis operations from the identified point of failure in accordance with the sequence identified by the one or more templates.

3. The method of claim 2, further comprising:
   receiving a third input with an instruction to begin performance of the remaining portion of the software interface and data analysis operations.

4. The method of claim 1, further comprising:
   generating an alert message indicating occurrence of the system failure.

5. The method of claim 1, wherein the monitoring is performed by a process thread that runs an operating system without being displayed to a user.

6. The method of claim 1, wherein the system failure is caused by a system latency.

7. The method of claim 6, wherein the system failure is caused by network latency.

8. The method of claim 6, wherein the system failure is caused by a hardware failure.

9. The method of claim 1, wherein the second input includes textual information in one of a plurality of languages supported by the automated application interface.

10. The method of claim 1, wherein the textual information comprises a plurality of plain language commands, plain language commands being commands that are not written using a programming language.

11. The method of claim 1, wherein the data analysis software is activity based management software.

12. The method of claim 1, wherein the templates are XML files.

13. The method of claim 1, wherein the captured information identifies the software interface operations.

14. The method of claim 1, wherein the captured information identifies the software interface operations and the data analysis operations.

15. A computer-implemented system for providing an automated application interface, comprising:
   one or more processors; and
   a computer-readable storage medium containing instructions to cause the one or more processors to perform operations including:
   receiving a first set of data;
   receiving a first input to perform one or more software interface operations to manipulate the first set of data between data analysis software and database software;
   capturing information associated with the first input;
   using the captured information to automatically generate and store a template for each software interface operation successfully performed;
   receiving an update to one or more of the templates to identify a subsequent set of data;
   receiving a second input that includes textual information identifying an execution sequence for the templates;
   automatically executing the templates in the identified sequence to perform software interface and data analysis operations on the subsequent set of data;

during execution of the one or more software interface and data analysis operations, monitoring for a system failure; and upon detection of a system failure, automatically terminating a failed operation and identifying a point of failure in the failed operation.

16. The system of claim 15, wherein the instructions are further configured to cause the one or more processors to perform a remaining portion of the software interface and data analysis operations from the identified point of failure in accordance with the sequence identified by the one or more templates.

17. The system of claim 16, wherein the instructions are further configured to cause the one or more processors to receive a third input with an instruction to begin performance of the remaining portion of the software interface and data analysis operations.

18. The system of claim 15, wherein the instructions are further configured to cause the one or more processors to generate an alert message indicating occurrence of the system failure.

19. The system of claim 15, wherein the monitoring is performed by a process thread that runs an operating system without being displayed to a user.

20. The system of claim 15, wherein the system failure is caused by a system latency.

21. The system of claim 20, wherein the system failure is caused by network latency.

22. The system of claim 20, wherein the system failure is caused by a hardware failure.

23. The system of claim 15, wherein the second input includes textual information in one of a plurality of languages supported by the automated application interface.

24. The system of claim 15, wherein the textual information comprises a plurality of plain language commands, plain language commands being commands that are not written using a programming language.

25. The system of claim 15, wherein the data analysis software is activity based management software.

26. The system of claim 15, wherein the templates are XML files.

27. The system of claim 15, wherein the captured information identifies the software interface operations.

28. The system of claim 15, wherein the captured information identifies the software interface operations and the data analysis operations.

29. A computer-program product for providing an automated application interface, the computer-program product including a non-transitory machine-readable storage medium having instructions stored thereon the instructions configured to cause a data processing apparatus to perform operations including:

receiving a first set of data;

receiving a first input to perform one or more software interface operations to manipulate the first set of data between data analysis software and database software;

capturing information associated with the first input;

using the captured information to automatically generate and store a template for each software interface operation successfully performed;

receiving an update to one or more of the templates to identify a subsequent set of data;

receiving a second input that includes textual information identifying an execution sequence for the templates;

automatically executing the templates in the identified sequence to perform software interface and data analysis operations on the subsequent set of data;

during execution of the one or more software interface and data analysis operations, monitoring for a system failure; and upon detection of a system failure, automatically terminating a failed operation and identifying a point of failure in the failed operation.

30. The computer-program product of claim 29, wherein the operations further include:

performing a remaining portion of the software interface and data analysis operations from the identified point of failure in accordance with the sequence identified by the one or more templates.

31. The method of claim 30, wherein the operations further include:

receiving a third input with an instruction to begin performance of the remaining portion of the software interface and data analysis operations.

32. The computer-program product of claim 29, wherein the operations further include:

generating an alert message indicating occurrence of the system failure.

33. The computer-program product of claim 29, wherein the monitoring is performed by a process thread that runs an operating system without being displayed to a user.

34. The computer-program product of claim 29, wherein the system failure is caused by a system latency.

35. The computer-program product of claim 34, wherein the system failure is caused by network latency.

36. The computer-program product of claim 34 wherein the system failure is caused by a hardware failure.

37. The computer-program product of claim 29, wherein the second input includes textual information in one of a plurality of languages supported by the automated application interface.

38. The computer-program product of claim 29, wherein the textual information comprises a plurality of plain language commands, plain language commands being commands that are not written using a programming language.

39. The computer-program product of claim 29, wherein the data analysis software is activity based management software.

40. The computer-program product of claim 29, wherein the templates are XML files.

41. The computer-program product of claim 29, wherein the captured information identifies the software interface operations.

42. The computer-program product of claim 29, wherein the captured information identifies the software interface operations and the data analysis operations.

* * * * *